United States Patent
Jo et al.

(10) Patent No.: US 11,921,953 B2
(45) Date of Patent: Mar. 5, 2024

(54) APPARATUS AND METHOD FOR SENSING TOUCH BASED ON MULTI-CHANNEL

(71) Applicant: Samsung Electronics Co., Ltd., Suwon-si (KR)

(72) Inventors: Yunrae Jo, Yongin-si (KR); Jinchul Lee, Seoul (KR); Sungyong Cho, Hwaseong-si (KR); Bumsoo Kim, Seoul (KR); Yoonkyung Choi, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 267 days.

(21) Appl. No.: 17/209,838

(22) Filed: Mar. 23, 2021

(65) Prior Publication Data
US 2022/0050576 A1    Feb. 17, 2022

(30) Foreign Application Priority Data

Aug. 13, 2020    (KR) .................. 10-2020-0102056

(51) Int. Cl.
*G06F 3/041*    (2006.01)
*G06F 3/0354*    (2013.01)
*G06F 3/044*    (2006.01)

(52) U.S. Cl.
CPC ...... *G06F 3/04186* (2019.05); *G06F 3/03545* (2013.01); *G06F 3/0412* (2013.01); *G06F 3/04162* (2019.05); *G06F 3/04164* (2019.05); *G06F 3/0446* (2019.05)

(58) Field of Classification Search
CPC .. G06F 3/0412; G06F 3/04162; G06F 3/0446; G06F 3/04166; G06F 3/04186; G06F 3/03545; G06F 3/04164
See application file for complete search history.

(56) References Cited

U.S. PATENT DOCUMENTS

| | | |
|---|---|---|
| 8,432,364 B2 | 4/2013 | Krah |
| 9,563,294 B2 | 2/2017 | Lee |
| 10,209,842 B2 | 2/2019 | Lee et al. |
| 10,222,916 B2 | 3/2019 | Ishii |
| 10,275,107 B2 | 4/2019 | Teranishi et al. |

(Continued)

FOREIGN PATENT DOCUMENTS

| | | |
|---|---|---|
| KR | 10-2015-0055707 A | 5/2015 |
| KR | 101983561 B1 | 9/2019 |

*Primary Examiner* — Amare Mengistu
*Assistant Examiner* — Sarvesh J Nadkarni
(74) *Attorney, Agent, or Firm* — Harness, Dickey & Pierce, P.L.C.

(57) ABSTRACT

An apparatus for sensing a touch includes: a sensor array including a plurality of sensor groups, each of the plurality of sensor groups including sensors adjacent to each other; a first switch circuit configured to connect each of the plurality of sensor groups to a first channel or a second channel according to a first control signal; and a second switch circuit configured to select one of the first channel and the second channel according to a second control signal, wherein the first channel includes first signal lines connected to respective sensors included in a first sensor group of the plurality of sensor groups by the first switch circuit, and the second channel includes a second signal line commonly connected to the sensors included in the first sensor group by the first switch circuit.

20 Claims, 17 Drawing Sheets

(56) References Cited

U.S. PATENT DOCUMENTS

| | | |
|---|---|---|
| 10,359,882 B2 | 7/2019 | Kim |
| 10,408,862 B2 | 9/2019 | Gao |
| 10,409,414 B2 | 9/2019 | Kim et al. |
| 2015/0116263 A1* | 4/2015 | Kim ................. G06F 3/0443 345/174 |
| 2015/0177868 A1* | 6/2015 | Morein ............ G06F 3/03545 345/174 |
| 2015/0378486 A1* | 12/2015 | Yu .................. G06F 3/04164 427/79 |
| 2018/0364857 A1 | 12/2018 | Lai et al. |
| 2019/0138150 A1 | 5/2019 | Kim et al. |
| 2019/0155431 A1* | 5/2019 | Lee ..................... H03M 1/12 |

* cited by examiner

APPARATUS AND METHOD FOR SENSING TOUCH BASED ON MULTI-CHANNEL

CROSS-REFERENCE TO RELATED APPLICATION

This application is based on and claims priority under 35 U.S.C. § 119 to Korean Patent Application No. 10-2020-0102056, filed on Aug. 13, 2020, in the Korean Intellectual Property Office, the disclosure of which is incorporated by reference herein in its entirety.

BACKGROUND

The inventive concepts relate to touch sensing, and more particularly, to apparatuses and methods for sensing a touch based on a multi-channel.

A touch system for receiving a user input based on a touch is used for various applications. For example, the touch system may include a sensor array on a display panel and detect coordinates of an object, e.g., a user's body or a stylus pen, approaching or touching the sensor array. The touch system may be used as a means for receiving a user input in not only stationary applications such as a kiosk but also mobile applications such as a mobile phone. Accordingly, the touch system may be required to not only accurately detect a touch but also have a reduced cost, e.g., reduced power consumption and a reduced area.

SUMMARY

One aspect of the inventive concepts relate to signal processing for touch detection and provides a front-end circuit configured to perform analog-digital conversion and a touch processing circuit including the same.

According to an aspect of the inventive concepts, there is provided an apparatus for sensing a touch, the apparatus including: a sensor array including a plurality of sensor groups, each of the plurality of sensor groups including sensors adjacent to each other; a first switch circuit configured to connect each of the plurality of sensor groups to a first channel or a second channel according to a first control signal; and a second switch circuit configured to select one of the first channel and the second channel according to a second control signal, wherein the first channel includes first signal lines connected to respective sensors included in a first sensor group of the plurality of sensor groups by the first switch circuit, and the second channel includes a second signal line commonly connected to the sensors included in the first sensor group by the first switch circuit.

According to another aspect of the inventive concepts, there is provided an apparatus for sensing a touch, the apparatus including: a sensor array including a plurality of sensor groups, each of the plurality of sensor groups including sensors adjacent to each other; a first switch circuit connected to each of sensors included in the plurality of sensor groups; a second switch circuit connected to the first switch circuit through a first channel and a second channel; an analog front-end circuit configured to generate a sensing signal based on signals provided from the second switch circuit; and a controller configured to control the first switch circuit so that each of the plurality of sensor groups is connected to the first channel or the second channel, and control the second switch circuit to select one of the first channel and the second channel.

According to another aspect of the inventive concepts, there is provided a method of sensing a touch by using a plurality of sensor groups, each of the plurality of sensor groups including sensors adjacent to each other, the method including: connecting each of the plurality of sensor groups to a first channel or a second channel; selecting one of the first channel and the second channel; generating a sensing signal from a signal received through the selected channel; and identifying a touch based on the sensing signal, wherein the first channel includes signal lines corresponding to respective sensors included in a sensor group of the plurality of sensor groups, and the second channel includes a signal line commonly corresponding to the sensors included in the sensor group.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Figure 1:
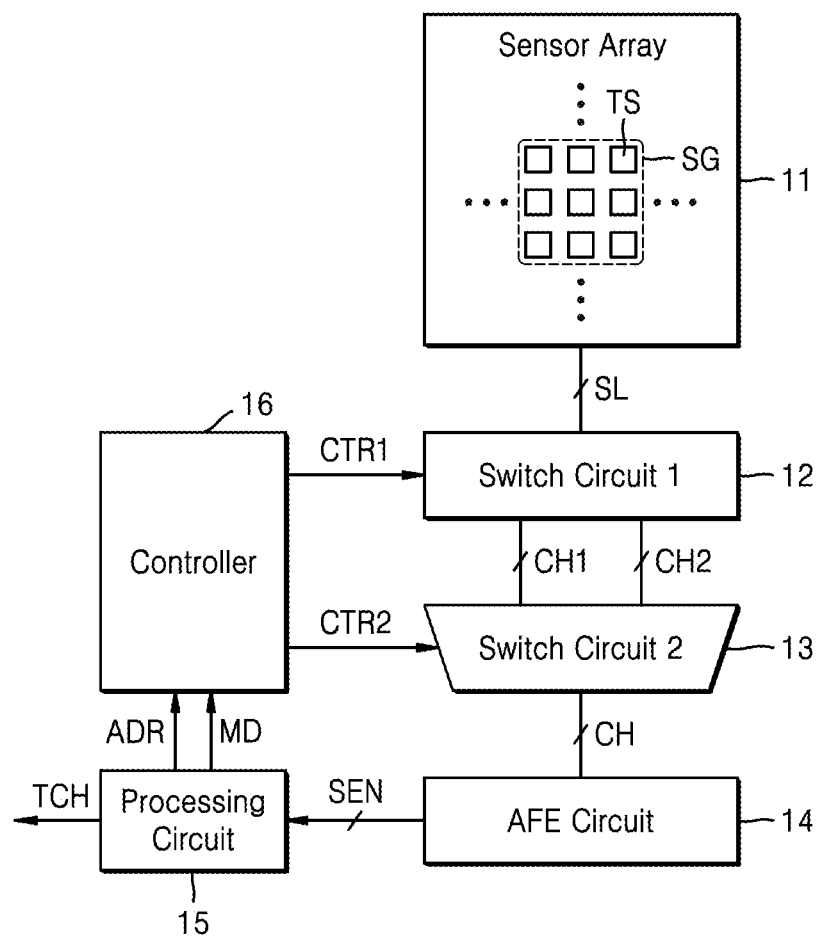
FIG. 1 is a block diagram of a touch sensing apparatus according to an example embodiment of the inventive concepts.

FIG. 1 is a block diagram of a touch sensing apparatus 10 according to an example embodiment of the inventive concepts. As shown in FIG. 1, the touch sensing apparatus 10 may include a sensor array 11, a first switch circuit 12, a second switch circuit 13, an analog front-end (AFE) circuit 14, a processing circuit 15, and a controller 16. As described below, the touch sensing apparatus 10 may sense a touch by using a multi-channel and may be referred to as the touch sensing apparatus based on a multi-channel herein.

The touch sensing apparatus 10 may detect a touch of an object on the sensor array 11. The object may indicate an arbitrary target of which a touch is sensible by the sensor array 11. For example, the object may indicate a part (e.g., a finger) of a user's body, matter (e.g., a glove or a pen) which the user wears or uses, a component of another system of which a position changes in response to an operation, or the like. The touch sensing apparatus 10 may be used as a component configured to receive an input from the outside in various applications. In some example embodiments, the sensor array 11 may be disposed on a display panel, and the touch sensing apparatus 10 may be used to receive an input provided by the user in response to a displayed screen image provided to the user through the display panel. For example, the touch sensing apparatus 10 may be used as a component of a stationary electronic system such as a kiosk, a mobile electronic system such as a mobile phone, or a vehicle means such as an automobile. In some example embodiments, the sensor array 11 may be disposed independently to the display panel, like a touch pad, a pen tablet, a smart pad, or the like. Herein, a touch may not only indicate a contact with the sensor array 11 but also generally indicate proximity to the sensor array 11.

The sensor array 11 may include a plurality of sensors arranged in a touch region to detect not only whether a touch has occurred but also a position where the touch has occurred. For example, the sensor array 11 may include a plurality of capacitive sensors each of which a capacitance varies in response to a touch and/or a plurality of resistive sensors each of which a resistance varies in response to a touch. A sensor may also be referred to as a sensor electrode. In the sensor array 11, the plurality of sensors may be disposed at points where a series of rows intersect with a series of columns, and may be connected to the first switch circuit 12 through a plurality of sensor lines SL. Herein, a connection between both components may indicate that the components come in contact with or are electrically connected to each other through a conductive material.

In some example embodiments, the sensor array 11 may include a plurality of sensor groups each of which includes sensors adjacent to each other like a sensor group SG. For example, as shown in FIG. 1, the sensor array 11 may include the sensor group SG including mutually adjacent 3×3 sensors including a sensor TS. As described below, the 3×3 sensors included in the sensor group SG may be simultaneously accessed and may be commonly connected to a signal line included in a second channel CH2 by the first switch circuit 12. In addition, the 3×3 sensors included in the sensor group SG may be respectively connected to nine signal lines included in a first channel CH1 by the first switch circuit 12. Hereinafter, example embodiments of the inventive concepts will be described with reference to the sensor group SG including the 3×3 sensors as shown in FIG. 1, but a sensor group including a different number of sensors from those of the sensor group SG and/or sensors aligned differently from those of the sensor group SG may be used.

The first switch circuit 12 may be connected to the sensor array 11, e.g., the plurality of sensors included in the sensor array 11, through the plurality of sensor lines SL, respectively, and may receive a first control signal CTR1 from the controller 16. The first switch circuit 12 may connect each of the plurality of sensor lines SL to the first channel CH1 or the second channel CH2 based on the first control signal CTR1. That is, the first switch circuit 12 may connect each of the plurality of sensors included in the sensor array 11 to the first channel CH1 or the second channel CH2 based on the first control signal CTR1.

Each of the first channel CH1 and the second channel CH2 may include a plurality of signal lines. For example, the first channel CH1 may include the nine signal lines respectively connected to the 3×3 sensors included in the sensor group SG by the first switch circuit 12, and the second channel CH2 may include the signal line commonly connected to the 3×3 sensors included in the sensor group SG by the first switch circuit 12. Accordingly, each of the 3×3 sensors included in the sensor group SG may independently sense a touch through the first channel CH1, and the 3×3 sensors included in the sensor group SG may commonly sense the touch through the second channel CH2. An operation of the first switch circuit 12 will be described below with reference to FIGS. 2A and 2B.

The second switch circuit 13 may be connected to the first switch circuit 12 through the first channel CH1 and the second channel CH2 and receive a second control signal CTR2 from the controller 16. The second switch circuit 13 may select one of the first channel CH1 and the second channel CH2 based on the second control signal CTR2 and provide the selected channel CH to the AFE circuit 14. For example, the second control signal CTR2 may indicate a sensing mode, and the second switch circuit 13 may select one of the first channel CH1 and the second channel CH2 according to the sensing mode.

The AFE circuit 14 may be connected to the second switch circuit 13 through the selected channel CH, generate a sensing signal SEN, and provide the sensing signal SEN to the processing circuit 15. The AFE circuit 14 may provide a signal for sensing a touch to the sensor array 11 through the second switch circuit 13 and the first switch circuit 12 and receive, from the sensor array 11, a signal modified by the touch. The AFE circuit 14 may include a plurality of unit circuits corresponding to the number of signal lines included in the selected channel CH, and generate the sensing signal SEN by simultaneously processing signals received through the selected channel CH. For example, the AFE circuit 14 may simultaneously process signals received from sensors included in a region of interest. In some example embodiments, the touch sensing apparatus 10 may communicate with an active pen as described below with reference to FIG. 9, and the AFE circuit 14 may generate a signal, e.g., a beacon signal, for communicating with the active pen and output the beacon signal through the selected channel CH.

The processing circuit 15 may receive the sensing signal SEN from the AFE circuit 14 and generate a touch signal TCH. In some example embodiments, the processing circuit 15 may process the sensing signal SEN to identify a position of a sensor having sensed a touch in the sensor array 11, e.g., coordinates of the touch, and to generate the touch signal TCH including the coordinates of the touch. In addition, in some example embodiments, the processing circuit 15 may process the sensing signal SEN to identify a strength of a touch sensed by the sensor array 11 and to generate the touch signal TCH including the strength of the touch. In addition, in some example embodiments, the processing circuit 15 may process the sensing signal SEN to identify information received from the active pen and to generate the touch signal TCH including the identified information. In some example embodiments, the processing circuit 15 or the AFE circuit 14 may include an analog-digital converter (ADC).

The processing circuit 15 may generate an address signal ADR and a mode signal MD and provide the address signal ADR and the mode signal MD to the controller 16. The address signal ADR may have a value for accessing at least one of the plurality of sensor groups included in the sensor array 11. In some example embodiments, the processing circuit 15 may generate the address signal ADR having a value for accessing at least one sensor group, to sense a touch on the at least one sensor group. In addition, the mode signal MD may indicate one of a plurality of sensing modes, and the processing circuit 15 may generate the mode signal MD to set a sensing mode. An operation of the processing circuit 15 configured to generate the address signal ADR and the mode signal MD will be described below with reference to FIG. 10. In some example embodiments, the processing circuit 15 may include logic circuits designed by logic synthesis and/or at least one processor configured to execute a series of instructions.

The controller 16 may receive the address signal ADR and the mode signal MD from the processing circuit 15 and generate the first control signal CTR1 and the second control signal CTR2. For example, the controller 16 may decode the address signal ADR, and generate the first control signal CTR1 to access at least one sensor group corresponding to the address signal ADR. In addition, the controller 16 may generate the second control signal CTR2 based on a sensing mode indicated by the mode signal MD.

As shown in FIG. 1, sensing a touch by using the sensor array 11 in which the plurality of sensors are disposed may be referred to as a dot sensor scheme. Unlike the dot sensor scheme, a line sensor scheme may use a structure in which a series of sensors extending in a horizontal direction intersect with a series of sensors extending in a vertical direction. When a size of a touch panel in which the sensor array 11 is disposed increases, and a thickness thereof decreases, an influence of a parasitic component on sensors of the line sensor scheme may increase, and accordingly, the line sensor scheme may be suitable for a relatively small touch panel. Unlike the line sensor scheme, the dot sensor scheme may be suitable for a relatively large touch panel, but due to a large number of sensors, a structure for efficiently accessing a sensor and quickly detecting a touch may be significant.

As described above, the plurality of sensors in the sensor array 11 may be accessed in a unit of a sensor group, and accordingly, the number of signal lines for accessing the plurality of sensors may decrease, thereby resulting in easily implementing a touch panel of a large area by reducing or removing routing congestion of corresponding signal lines. In addition, a position of a touch on the wide touch panel may be quickly detected by sensing the touch in a unit of 3×3 sensors included in the sensor group SG (and additional adjacent sensors) according to a sensing mode.

Figure 2A:
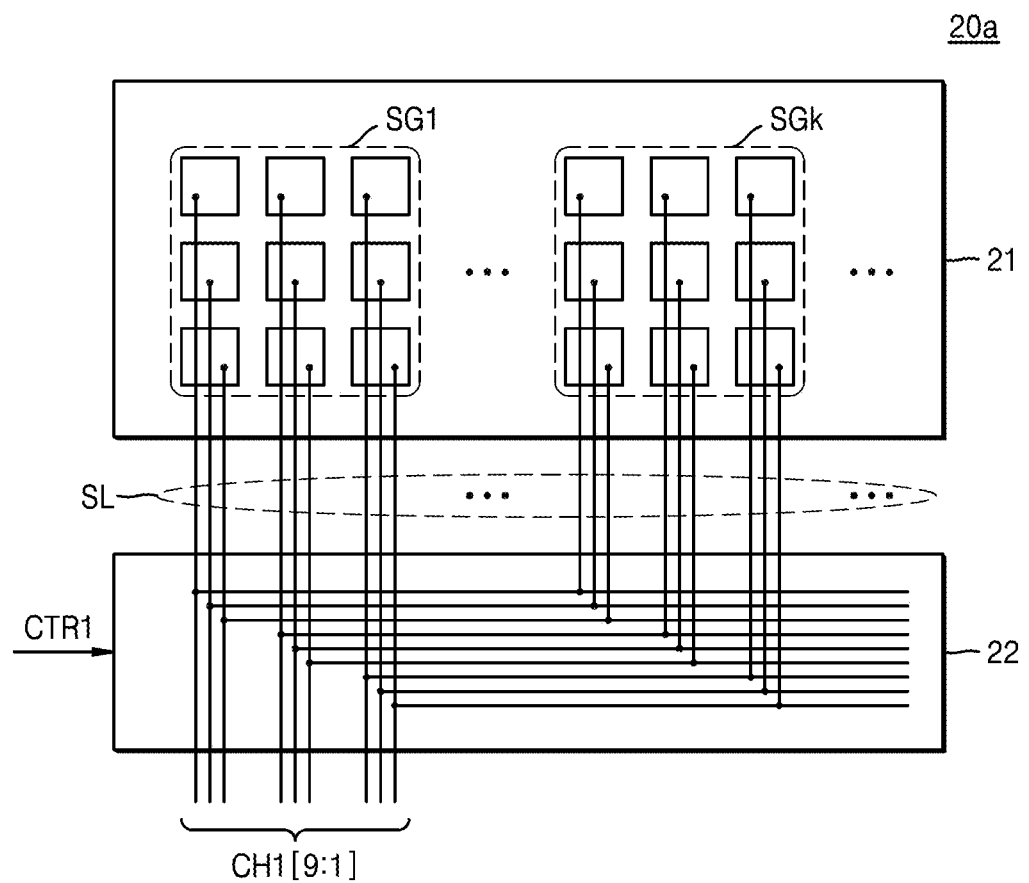
FIGS. 2A and 2B are block diagrams illustrating operations of a first switch circuit, according to example embodiments of the inventive concepts.
Figure 2B:
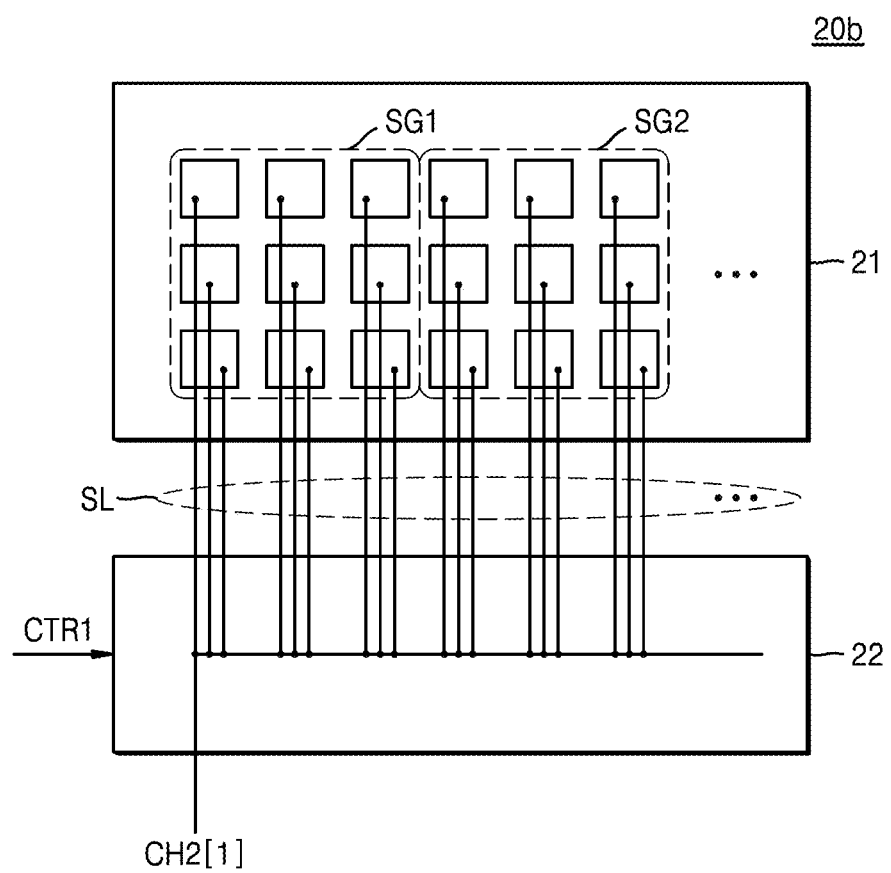

FIGS. 2A and 2B are block diagrams illustrating operations of a first switch circuit 22, according to example embodiments of the inventive concepts. As described above with reference to FIG. 1, the first switch circuit 22 of FIGS. 2A and 2B may connect sensors in a sensor array 21 to the first channel CH1 or the second channel CH2 based on the first control signal CTR1.

Referring to FIG. 2A, the first switch circuit 22 in a touch sensing apparatus 20*a* may connect 3×3 sensors in a first sensor group SG1 to nine signal lines CH1[9:1] included in the first channel CH1, respectively, in response to the first control signal CTR1. In addition, the first switch circuit 22 may connect 3×3 sensors in a kth sensor group SGk to the nine signal lines CH1[9:1] included in the first channel CH1, respectively, in response to the first control signal CTR1. As shown in FIG. 2A, in the sensor array 21, the first sensor group SG1 may not be adjacent to the kth sensor group SGk, that is, at least one sensor group may be between the first sensor group SG1 and the kth sensor group SGk. Herein, like the first sensor group SG1 and the kth sensor group SGk, sensor groups including, respectively, sensors connected each other in response to the first control signal CTR1 may be referred to having the same address. That is, the processing circuit 15 of FIG. 1 may simultaneously access, through the address signal ADR, sensor groups having the same address among a plurality of sensor groups included in the sensor array 21. An example of an arrangement of sensor groups having the same address will be described below with reference to FIG. 3.

Referring to FIG. 2B, the first switch circuit 22 in a touch sensing apparatus 20*b* may commonly connect the 3×3 sensors in the first sensor group SG1 to one signal line CH2[1] included in the second channel CH2 in response to the first control signal CTR1. In addition, the first switch circuit 22 may commonly connect 3×3 sensors in a second sensor group SG2 to the one signal line CH2[1] included in the second channel CH2 in response to the first control signal CTR1. As shown in FIG. 2B, the first sensor group SG1 may be adjacent to the second sensor group SG2. Accordingly, in the sensor array 21, the 6×3 sensors included in the first sensor group SG1 and the second sensor group SG2 adjacent to each other may operate as a single large sensor. Herein, like the first sensor group SG1 and the second sensor group SG2 of FIG. 2B, sensor groups including all sensors commonly connected in response to the first control signal CTR1 may be referred to as a group of sensor groups or a sensor section. An example of an arrangement of sensor sections will be described below with reference to FIG. 3.

Figure 3:
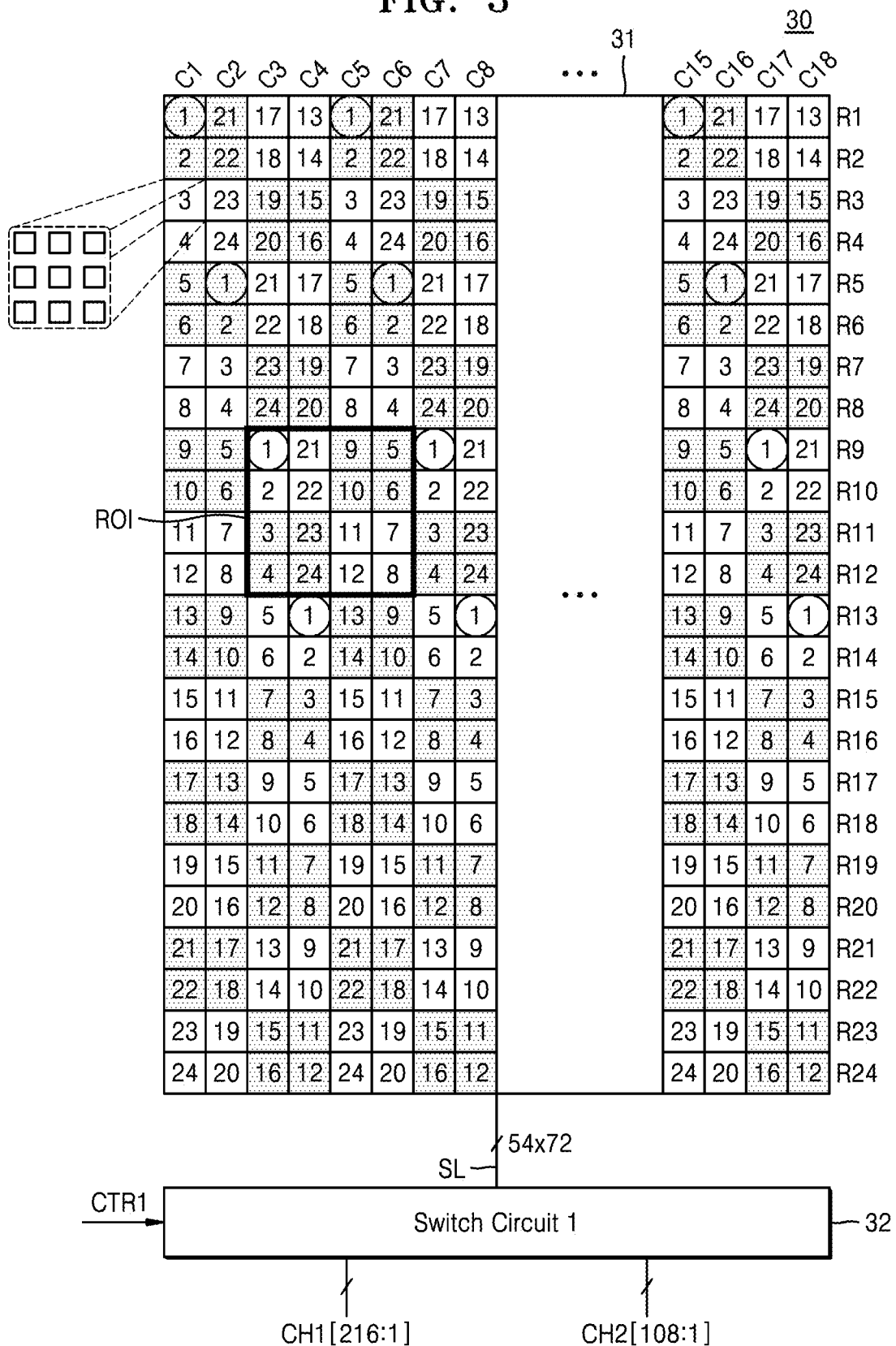
FIG. 3 is a block diagram of a touch sensing apparatus according to an example embodiment of the inventive concepts.

FIG. 3 is a block diagram of a touch sensing apparatus 30 according to an example embodiment of the inventive concepts. Particularly, the block diagram of FIG. 3 shows the touch sensing apparatus 30 including a sensor array 31 including 54×72 sensors. In addition, as described above with reference to FIG. 1, the sensor array 31 may include a plurality of sensor groups, and each of the plurality of sensor groups may include 3×3 sensors as shown in FIG. 3. Accordingly, the sensor array 31 may include 18×24 sensor groups aligned along first to $18^{th}$ columns C1 to C18 and first to $24^{th}$ rows R1 to R24. As shown in FIG. 3, the touch sensing apparatus 30 may include the sensor array 31 and a first switch circuit 32, and the sensor array 31 may be connected to the first switch circuit 32 through 54×72 sensor lines SL.

In some example embodiments, sensor groups may have different addresses in one column, respectively. For example, as shown in FIG. 3, each of the first to eighteenth columns C1 to C18 may include 24 sensor groups respectively having addresses of 1 to 24. Accordingly, when 24 sensor groups included in one column are connected to the first channel CH1 by the first switch circuit 32, all sensors, e.g., 216 sensors, included in the 24 sensor groups may be respectively connected to 216 signal lines CH1[216:1] included in the first channel CH1, and touch sensing may be simultaneously performed by the 216 sensors.

Sensor groups having the same address in the sensor array 31 may not be adjacent to each other. For example, as shown in FIG. 3, an address of a sensor group may be shifted by 4 as moving from the first column C1 to the $18^{th}$ column C18 one column by one column. Accordingly, in a region including sensor groups adjacent to each other, all the sensor groups may have different addresses. For example, as shown in FIG. 3, all sensor groups included in a region of interest ROI corresponding to a size of 4×4 sensor groups may have different addresses, respectively. Accordingly, when the 4×4 sensor groups included in the region of interest ROI are connected to the first channel CH1, touch sensing may be simultaneously performed by the 4×4 sensor groups. In some example embodiments, addresses may be mapped to sensor groups unlike shown in FIG. 3, and the region of interest ROI may also include a different number and/or arrangement of sensors from the 4×4 sensor groups.

In some example embodiments, a sensor section may include two or more sensor groups adjacent to each other. For example, a sensor section may include 2×2 sensor groups as identified with hatching in FIG. 3. Accordingly, when 2×2 sensor groups included in one sensor section are connected to the second channel CH2 by the first switch circuit 32, all sensors, e.g., 36 sensors, included in the 2×2 sensor groups may be commonly connected to one signal line included in the second channel CH2. The sensor array 31 may include 9×12 sensor sections, the second channel CH2 may include 108 signal lines CH2[108:1] respectively connected to the 9×12 sensor sections, and accordingly, touch sensing may be simultaneously performed by the 108 sensor sections.

In the touch sensing apparatus 30 of FIG. 3, the number (e.g., 216) of signal lines included in the first channel CH1 may be greater than the number (e.g., 108) of signal lines included in the second channel CH2, and accordingly, a second switch circuit and an AFE circuit may be connected to each other through the selected channel CH including at least 216 signal lines. In addition, the AFE circuit may include at least 216 unit circuits. Hereinafter, the example embodiments of the inventive concepts will be described with reference to the sensor array 31 of FIG. 3, but the example embodiments of the inventive concepts may also be applied to a sensor array having a sensor group configuration, a sensor section configuration, and address mapping different from those of the sensor array 31 of FIG. 3.

Figure 4:
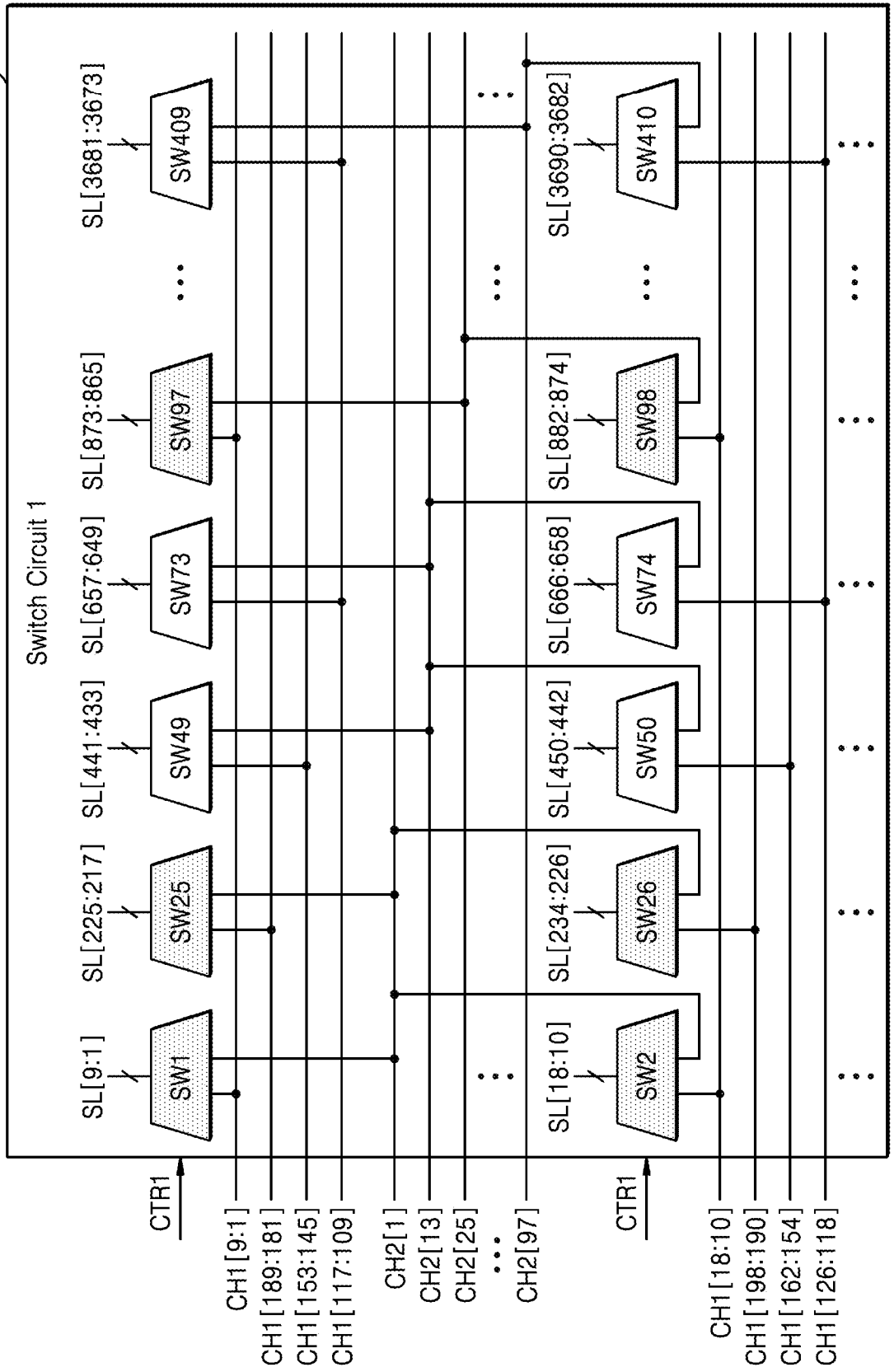
FIG. 4 is a block diagram of a first switch circuit according to an example embodiment of the inventive concepts.

FIG. 4 is a block diagram of a first switch circuit 40 according to an example embodiment of the inventive concepts. Particularly, the block diagram of FIG. 4 shows the first switch circuit 40 as an example of the first switch circuit 32 of FIG. 3. As described above with reference to FIG. 3, the first switch circuit 40 of FIG. 4 may connect the plurality of sensor lines SL to the first channel CH1 or the second channel CH2 based on the first control signal CTR1. Hereinafter, FIG. 4 will be described with reference to FIG. 3 together.

Referring to FIG. 4, the first switch circuit 40 may include a plurality of switch units respectively corresponding to the plurality of sensor groups in the sensor array 31. The sensor array 31 of FIG. 3 may include the 18×24 sensor groups, and accordingly, the first switch circuit 40 may also include 18×24 switch units. Each of the 18×24 switch units may be connected to 3×3 sensors included in one sensor group, through nine sensor lines. For example, a first switch unit SW1 may be connected through nine sensor lines SL[9:1] to 3×3 sensors in a sensor group located on a first column C1 and a first row R1 in the sensor array 31 of FIG. 3. In addition, a second switch unit SW2 may be connected through nine sensor lines SL[18:10] to 3×3 sensors in a sensor group located on the first column C1 and a second row R2 in the sensor array 31 of FIG. 3.

A switch unit may be connected to nine signal lines of the first channel CH1 according to an address of a sensor group corresponding to the switch unit. For example, the first switch unit SW1 may correspond to a sensor group having an address of 1, and accordingly, as shown in FIG. 4, the first switch unit SW1 may be connected to the nine signal lines CH1[9:1] of the first channel CH1. In addition, a $97^{th}$ switch unit SW97 may also correspond to the sensor group having the address of 1 and may be connected to the nine signal lines CH1[9:1] of the first channel CH1.

Switch units corresponding to sensor groups included in the same sensor section may be commonly connected to one signal line of the second channel CH2. For example, as shown in FIG. 4, the first switch unit SW1, the second switch unit SW2, a $25^{th}$ switch unit SW25, and a $26^{th}$ switch unit SW26, which correspond to 2×2 sensor groups included in one sensor section, may be commonly connected to a signal line CH2[1] included in the second channel CH2. Similarly, a $49^{th}$ switch unit SW49, a $50^{th}$ switch unit SW50, a $73^{rd}$ switch unit SW73, and a $74^{th}$ switch unit SW74 corresponding to 2×2 sensor groups included in one sensor section may be commonly connected to a signal line CH2[13] included in the second channel CH2.

Each switch unit may be controlled by the first control signal CTR1, and according to the first control signal CTR1, nine sensor lines may be respectively connected to nine signal lines included in the first channel CH1 or commonly connected to one signal line included in the second channel CH2. Examples of a switch unit will be described below with reference to FIGS. 6A and 6B.

Figure 5:
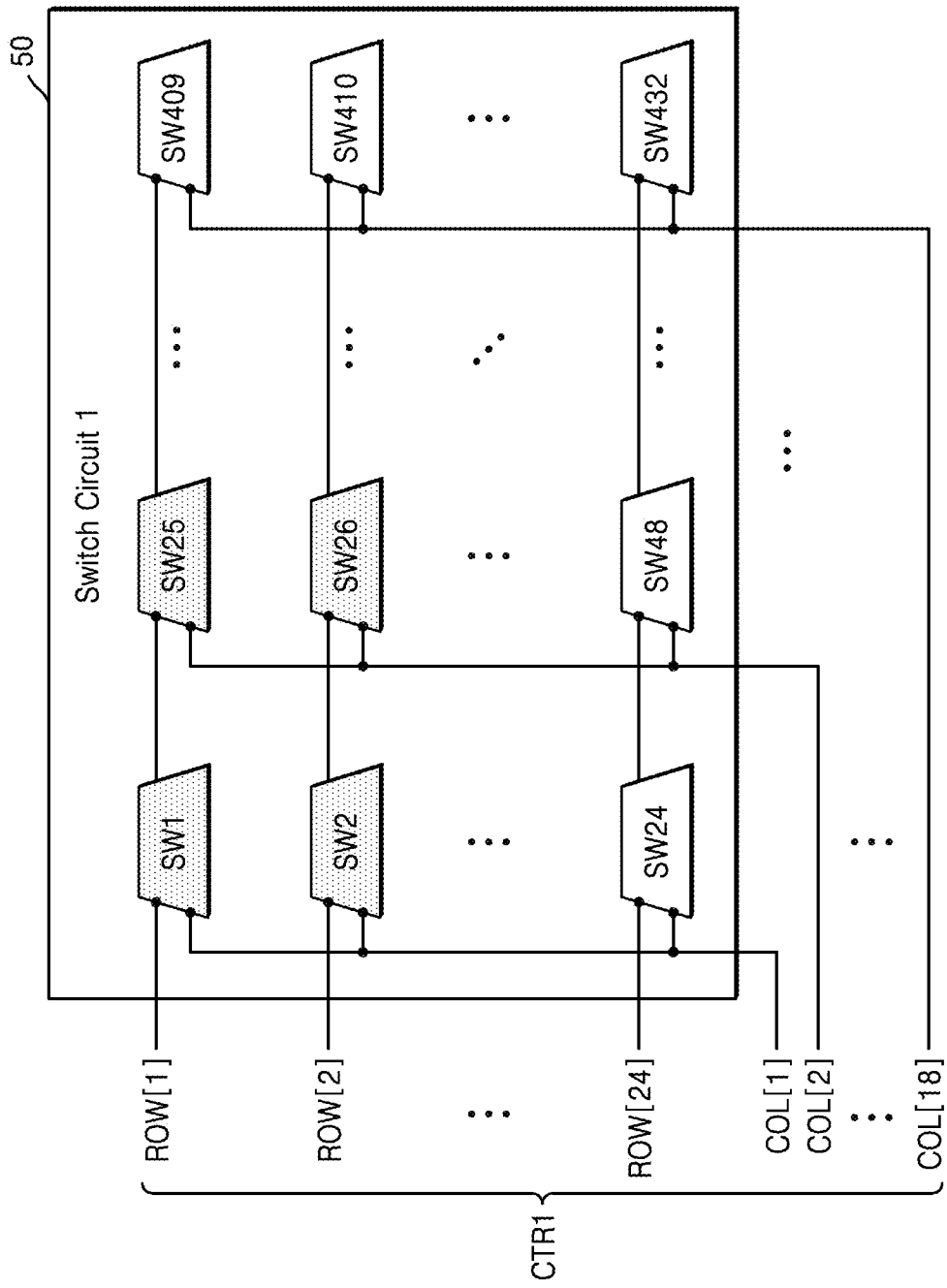
FIG. 5 is a block diagram of a first switch circuit according to an example embodiment of the inventive concepts.

FIG. 5 is a block diagram of a first switch circuit 50 according to an example embodiment of the inventive concepts. Particularly, the block diagram of FIG. 5 shows the first switch circuit 50 as an example of the first switch circuit 32 of FIG. 3. For convenience of illustrating, the plurality of sensor lines SL, the first channel CH1, and the second channel CH2 are not shown in FIG. 5. Hereinafter, FIG. 5 will be described with reference to FIG. 3 together.

Referring to FIG. 5, the first switch circuit 50 may include 18×24 switch units, e.g., first to $432^{nd}$ switch units SW1 to SW432, respectively corresponding to the 18×24 sensor groups included in the sensor array 31 of FIG. 3, as described above with reference to FIG. 4. In some example embodiments, the first to $432^{nd}$ switch units SW1 to SW432 in the first switch circuit 50 may be controlled by a row select signal and a column select signal. For example, as shown in FIG. 5, the first control signal CTR1 may include a 24-bit row select signal ROW[24:1] and an 18-bit column select signal COL[18:1]. Accordingly, the number of signal lines for controlling the first to $432^{nd}$ switch units SW1 to SW432 may decrease (24+18<432), and an area required at one side or both sides of a touch panel to route corresponding signal lines may decrease.

As shown in FIG. 5, the first to $432^{nd}$ switch units SW1 to SW432 may correspond to 18 columns and 24 rows like the 18×24 sensor groups in the sensor array 31. Switch units corresponding to one row may commonly receive one bit of a row select signal, and switch units corresponding to one column may commonly receive one bit of a column select signal. For example, the first switch unit SW1, the $25^{th}$ switch unit SW25, and the $409^{th}$ switch unit SW409 may commonly receive a first bit ROW[1] of a row select signal, the second switch unit SW2, the $26^{th}$ switch unit SW26, and the $410^{th}$ switch unit SW410 may commonly receive a second bit ROW[2] of the row select signal, and the $24^{th}$ switch unit SW24, the $48^{th}$ switch unit SW48, and the $432^{nd}$ switch unit SW432 may commonly receive a $24^{th}$ bit ROW[24] of the row select signal. In addition, the first to $24^{th}$ switch units SW1 to SW24 may commonly receive a first bit COL[1] of a column select signal, the $25^{th}$ to $48^{th}$ switch units SW25 to SW48 may commonly receive a second bit COL[2] of the column select signal, and the $409^{th}$ to $432^{nd}$ switch units SW409 to SW432 may commonly receive an $18^{th}$ bit COL[18] of the column select signal. In some example embodiments, each of the first to $432^{nd}$ switch units SW1 to SW432 may connect nine sensor lines to nine signal lines included in the first channel CH1, respectively, in response to an activated bit of a row select signal and an activated bit of a column select signal and commonly connect the nine sensor lines to one signal line included in the second channel CH2 in response to a deactivated bit of the row select signal or a deactivated bit of the column select signal, as described below with reference to FIG. 6B.

Figure 6A:
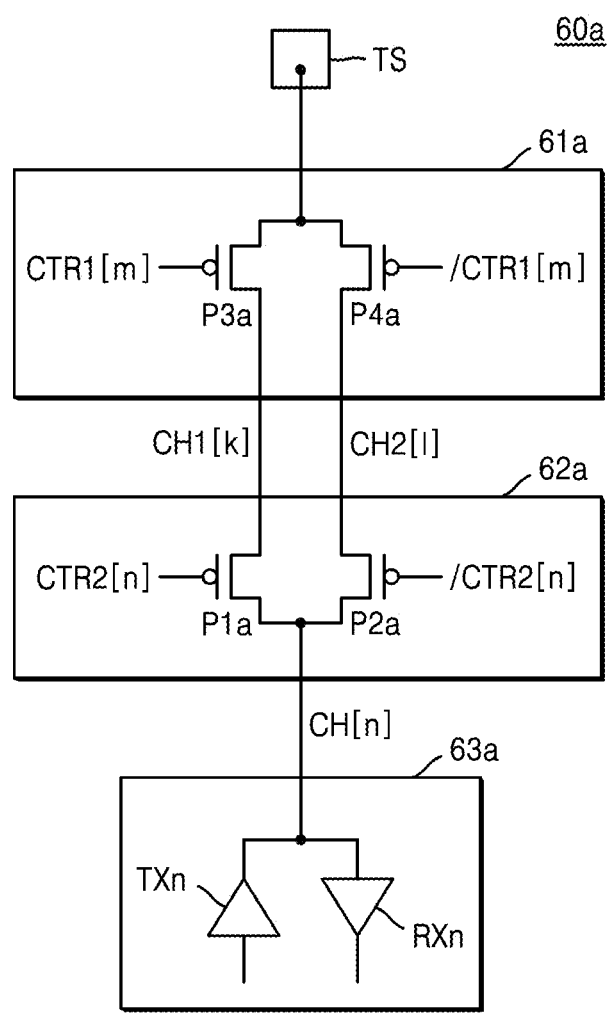
FIGS. 6A and 6B are block diagrams of touch sensing apparatuses according to example embodiments of the inventive concepts.
Figure 6B:
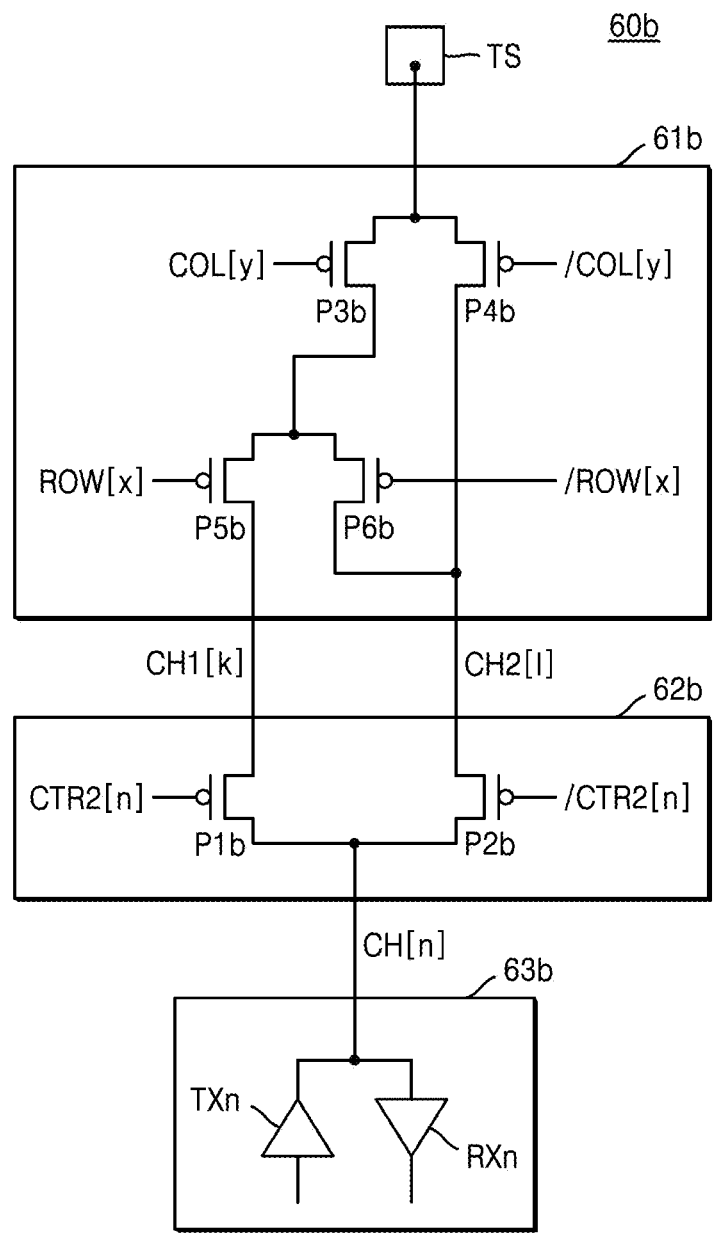

FIGS. 6A and 6B are block diagrams of touch sensing apparatuses according to example embodiments of the inventive concepts. Particularly, the block diagrams of FIGS. 6A and 6B show parts corresponding to one sensor TS in touch sensing apparatuses 60a and 60b respectively including first switch circuits 61a and 61b of different structures. Although FIGS. 6A and 6B show that each of transistors is a p-channel field effect transistor (PFET), at least one of transistors of FIGS. 6A and 6B may be an n-channel field effect transistor (NFET). In FIGS. 6A and 6B, the first control signal CTR1 and the second control signal CTR2 may be active low signals, and accordingly, the first control signal CTR1 and the second control signal CTR2 may be activated with a low level and deactivated with a high level. Hereinafter, a duplicated description of FIGS. 6A and 6B will be omitted.

Referring to FIG. 6A, the touch sensing apparatus 60a may include the first switch circuit 61a, a second switch circuit 62a, and an AFE circuit 63a. The first switch circuit 61a may include a third PFET P3a and a fourth PFET P4a connected to the sensor TS, and one switch unit may include nine PFET pairs, each PFET pair including two PFETs like the third PFET P3a and the fourth PFET P4a. As shown in FIG. 6A, the third PFET P3a may be controlled by one bit CTR1[m] ($1 \leq m \leq 432$) of the first control signal CTR1 and connected to one signal line CH1[k] ($1 \leq k \leq 216$) included in the first channel CH1. In addition, the fourth PFET P4a may be controlled by one inverted bit /CTR1[m] of the first control signal CTR1 and connected to one signal line CH2[1] ($1 \leq l < 108$) included in the second channel CH2. Accordingly, the first switch circuit 61a may connect the sensor TS to the signal line CH1[k] of the first channel CH1 in response to the activated bit CTR1[m] (e.g., having the low level) of the first control signal CTR1, and connect the sensor TS to the signal line CH2[1] of the second channel CH2 in response to the deactivated bit CTR1[m] (e.g., having the high level) of the first control signal CTR1.

The second switch circuit 62a may include a first PFET P1a and a second PFET P2a connected to one signal line CH[n] ($1 \leq n \leq 216$) included in the selected channel CH, and the second switch circuit 62a may include 216 PFET pairs corresponding to the number of signal lines included in the first channel CH1, each PFET pair including two PFETs like the first PFET P1a and the second PFET P2a. As shown in FIG. 6A, the first PFET P1a may be controlled by one bit CTR2[n] of the second control signal CTR2 and connected to the one signal line CH1[k] included in the first channel CH1. In addition, the second PFET P2a may be controlled by an inverted bit /CTR2[n] of the second control signal CTR2 and connected to the one signal line CH2[1] included in the second channel CH2. Accordingly, the second switch circuit 62a may select the signal line CH1[k] of the first channel CH1 in response to the activated bit CTR2[n] (e.g., having the low level) of the second control signal CTR2, and select the signal line CH2[1] of the second channel CH2 in response to the deactivated bit CTR2[1] (e.g., having the high level) of the second control signal CTR2.

The AFE circuit 63a may include a transmission circuit TXn and a reception circuit RXn connected to the one signal line CH[n] included in the selected channel CH. The AFE circuit 63a may include 216 circuits corresponding to the number of signal lines included in the selected channel CH, each circuit including a transmission circuit and a reception circuit like the transmission circuit TXn and the reception circuit RXn.

Referring to FIG. 6B, the touch sensing apparatus 60b may include the first switch circuit 61b, a second switch circuit 62b, and an AFE circuit 63b, and as described above with reference to FIG. 5, the first control signal CTR1 may include a column select signal COL and a row select signal ROW. The first switch circuit 61b may include a third PFET P3b and a fourth PFET P4b connected to the sensor TS, and include a fifth PFET P5b and a sixth PFET P6b connected to the third PFET P3b. One switch unit included in the first switch circuit 61b may include nine copies each including the third to sixth PFETs P3b to P6b. As shown in FIG. 6B, the third PFET P3b may be controlled by one bit COL[y] ($1 \leq y \leq 18$) of the column select signal COL and connected to the fifth PFET P5b and the sixth PFET P6b. In addition, the fourth PFET P4b may be controlled by an inverted bit /COL[y] of the column select signal COL and connected to one signal line CH2[1] of the second channel CH2. The fifth PFET P5b may be controlled by one bit ROW[x] ($1 \leq x \leq 24$) of the row select signal ROW and connected to one signal line CH1[k] included in the first channel CH1. In addition, the sixth PFET P6b may be controlled by an inverted bit /ROW[x] of the row select signal ROW and connected to one signal line CH2[1] included in the second channel CH2. Accordingly, the first switch circuit 61b may connect the sensor TS to the signal line CH1[k] of the first channel CH1 in response to the activated bit COL[y] (e.g., having the low level) of the column select signal COL and the activated bit ROW[x] (e.g., having the low level) of the row select signal ROW, and connect the sensor TS to the signal line CH2[1] of the second channel CH2 in response to the deactivated bit COL[y] (e.g., having the high level) of the column select signal COL or the deactivated bit ROW[x] (e.g., having the low level) of the row select signal ROW.

Similarly to the second switch circuit 62a of FIG. 6A, the second switch circuit 62b may include a first PFET P1b and a second PFET P2b. In addition, similarly to the AFE circuit 63a of FIG. 6A, the AFE circuit 63b may include the transmission circuit TXn and the reception circuit RXn.

Figure 7:
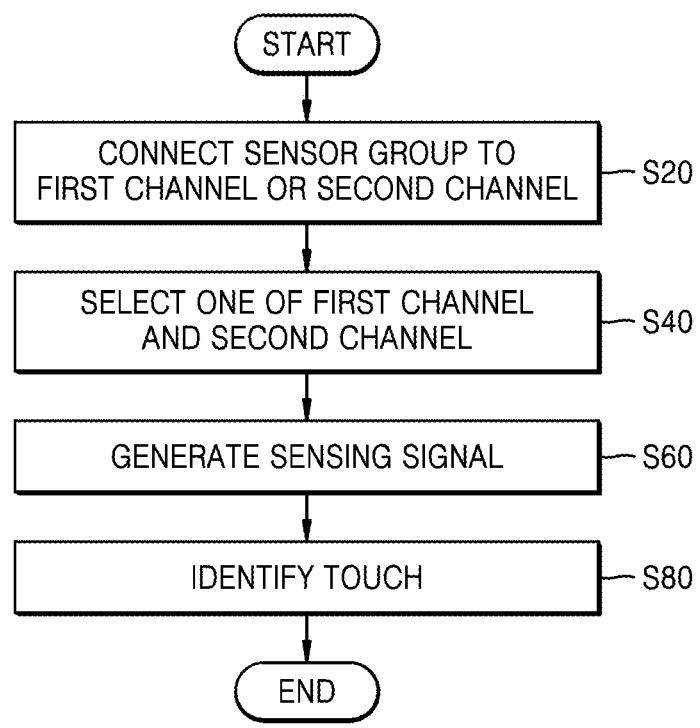
FIG. 7 is a flowchart of a touch sensing method according to an example embodiment of the inventive concepts.

FIG. 7 is a flowchart of a touch sensing method according to an example embodiment of the inventive concepts. As shown in FIG. 7, the touch sensing method may include a plurality of operations S20, S40, S60, and S80. In some example embodiments, the method of FIG. 7 may be performed by the touch sensing apparatus 10 of FIG. 1 and may be referred to as a method of sensing a touch based on a multi-channel herein. Hereinafter, FIG. 7 will be described with reference to FIG. 1 together.

In operation S20, a sensor group may be connected to the first channel CH1 or the second channel CH2. For example, the first switch circuit 12 may connect each of the plurality of sensor groups included in the sensor array 11 to the first channel CH1 or the second channel CH2, based on the first control signal CTR1 provided from the controller 16. To this end, the first switch circuit 12 may include a plurality of switch units controlled by the first control signal CTR1 as described above with reference to FIGS. 4 and 5, and the plurality of switch units may correspond to the plurality of sensor groups of the sensor array 11, respectively. In some example embodiments, the controller 16 may generate the first control signal CTR1 based on the address signal ADR provided from the processing circuit 15, and an example of an operation of connecting a sensor group to the first channel CH1 or the second channel CH2 according to the address signal ADR will be described below with reference to FIG. 8.

In operation S40, one of the first channel CH1 and the second channel CH2 may be selected. For example, the second switch circuit 13 may select one of the first channel CH1 and the second channel CH2 based on the second control signal CTR2 provided from the controller 16. The second switch circuit 13 may provide the selected channel CH to the AFE circuit 14. In some example embodiments, the controller 16 may generate the second control signal CTR2 based on the mode signal MD provided from the processing circuit 15, and accordingly, one of the first channel CH1 and the second channel CH2 may be selected according to a sensing mode. An example of operations S20 and S40 will be described below with reference to FIG. 12.

In operation S60, the sensing signal SEN may be generated. For example, the AFE circuit 14 may generate the sensing signal SEN by transmitting and receiving a signal through the channel CH selected by the second switch circuit 13. The AFE circuit 14 may generate different sensing signals SEN in each of when a touch is sensed from at least one sensor corresponding the selected channel CH and when no touch is sensed.

In operation S80, a touch may be identified. For example, the processing circuit 15 may identify whether a touch on the sensor array 11 has occurred, coordinates of the touch, a strength of the touch, and the like based on the sensing signal SEN provided from the AFE circuit 14 and generate the touch signal TCH including information about the identified touch. To this end, the processing circuit 15 may generate the address signal ADR and/or the mode signal MD and access at least one of the plurality of sensor groups included in the sensor array 11 through the address signal ADR and/or the mode signal MD. An example of operation S80 will be described below with reference to FIG. 10.

Figure 8:
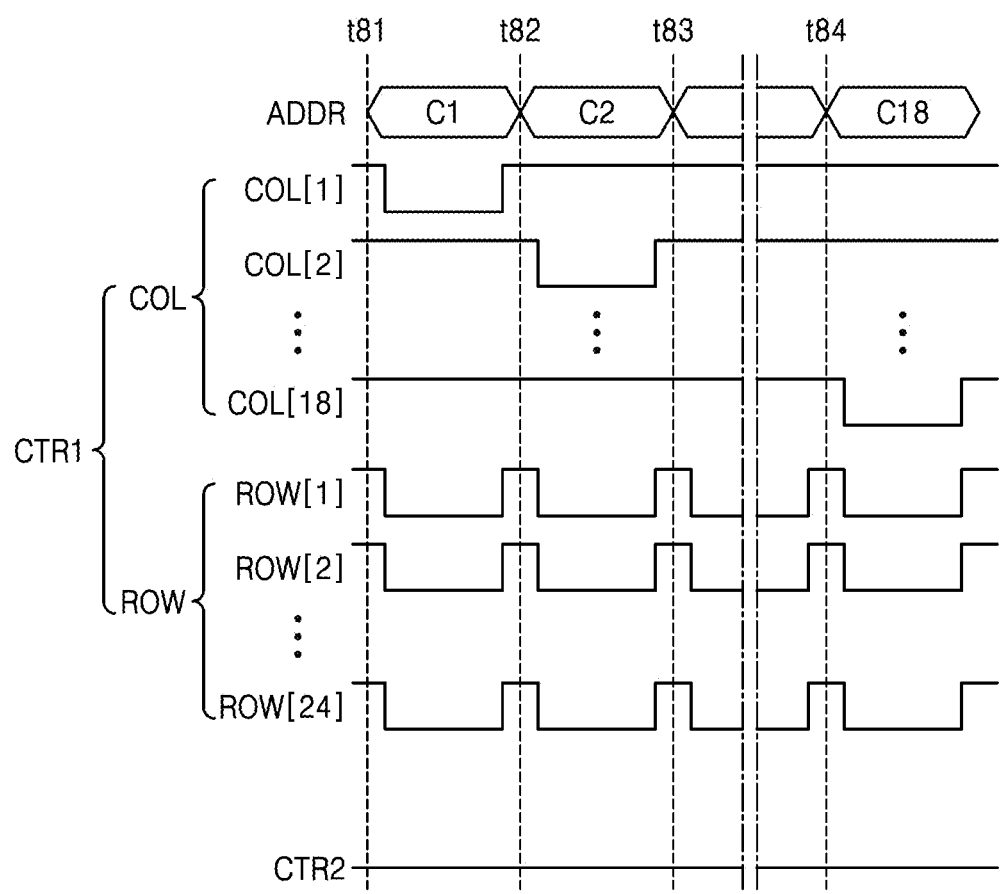
FIG. 8 is a timing diagram of an operation of accessing a sensor group, according to an example embodiment of the inventive concepts.

FIG. 8 is a timing diagram of an operation of accessing a sensor group, according to an example embodiment of the inventive concepts. In some example embodiments, an operation corresponding to the timing diagram of FIG. 8 may be performed by the touch sensing apparatus 10 of FIG. 1. In a description of FIG. 8, the sensor array 11 of FIG. 1 is assumed to be the sensor array 31 of FIG. 3, the first switch circuit 12 of FIG. 1 is assumed to be the first switch circuit 50 of FIG. 5, and FIG. 8 will be described with reference to FIGS. 1 and 3 together.

Referring to FIG. 8, the processing circuit 15 may access sensor groups in a column unit of the sensor array 11. For example, as shown in FIG. 8, at time t81, the processing circuit 15 may generate the address signal ADR corresponding to the first column C1. The controller 16 may activate the first bit COL[1] of the column select signal COL and activate all bits ROW[24:1] of the row select signal ROW, in response to the address signal ADR corresponding to the first column C1. Accordingly, the first switch circuit 12 may connect sensor groups included in the first column C1 to the first channel CH1 and connect sensor groups included in the second to 18$^{th}$ columns C2 to C18 to the second channel CH2.

Similarly, at time t82, the processing circuit 15 may generate the address signal ADR corresponding to the second column C2, and the controller 16 may activate the second bit COL[2] of the column select signal COL and activate all the bits ROW[24:1] of the row select signal ROW, in response to the address signal ADR corresponding to the second column C2. In addition, at time t84, the processing circuit 15 may generate the address signal ADR corresponding to a last column, i.e., the 18$^{th}$ column C18, and the controller 16 may activate the 18$^{th}$ bit COL[18] of the column select signal COL and activate all the bits ROW[24:1] of the row select signal ROW.

As shown in FIG. 8, while accessing sensor groups in a column unit, the processing circuit 15 may control the controller 16 to output the activated (e.g., having the low level) second control signal CTR2. The second switch circuit 13 may select the first channel CH1 in response to the activated second control signal CTR2. As described above with reference to FIG. 3, sensor groups included in one column may have different addresses, respectively, and sensors included in a corresponding sensor group may be connected to signal lines included in the first channel CH1, respectively. Accordingly, touch sensing may be simultaneously performed by sensor groups included in one column.

In some example embodiments, when a touch is sensed from a selected column, a signal for touch sensing may also be provided to columns adjacent to the selected column. For example, when a touch on the second column C2 is sensed between time t82 and time t83, the same signal as provided to the second column C2 may also be provided to the first column C1 and the third column C3. Accordingly, an influence of a capacitance formed between a selected column and an adjacent column may be removed or reduced, and adjacent columns may function as an active shield.

In some example embodiments, the touch sensing apparatus 10 may be set to a first operation mode of sensing a touch by using a sensor group as shown in FIG. 8 or a second operation mode of sensing a touch by switching between a coarse sensing mode and a fine sensing mode as described below with reference to FIGS. 10 to 12. For example, the touch sensing apparatus 10 may be set to the second operation mode for sensing a touch of an active pen, as described below. In some example embodiments, the touch sensing apparatus 10 may periodically attempt detection of an active pen, and when an active pen is detected, the touch sensing apparatus 10 may switch from the first operation mode to the second operation mode. In addition, in some example embodiments, the touch sensing apparatus 10 may receive, from the outside, a signal indicating that an active pen is used, and switch from the first operation mode to the second operation mode based on the received signal.

Figure 9:
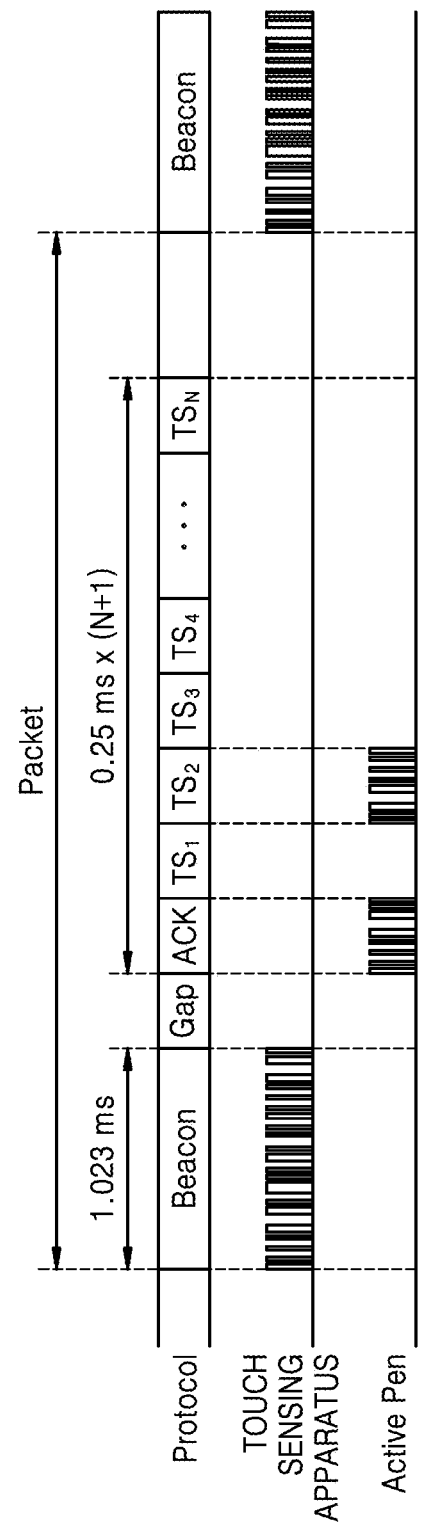
FIG. 9 is a timing diagram illustrating communication between a touch sensing apparatus and an active pen, according to an example embodiment of the inventive concepts.

FIG. 9 is a timing diagram illustrating communication between a touch sensing apparatus and an active pen, according to an example embodiment of the inventive concepts. Particularly, the timing diagram of FIG. 9 is an example of a protocol for the active pen and indicates communication based on a universal stylus initiative (USI) pen protocol. Hereinafter, example embodiments of the inventive concepts will be described by mainly referring to the USI pen protocol, but the example embodiments of the inventive concepts may also be applied to other protocols, e.g., a Microsoft pen protocol (MPP). Hereinafter, FIG. 9 will be described with reference to FIG. 1 together.

In some example embodiments, the sensor array 11 of FIG. 1 may communicate with the active pen. Unlike a general stylus pen configured to provide a touch to the touch sensing apparatus 10, the active pen may receive information from the touch sensing apparatus 10 and provide additional information different from a touch to the touch sensing apparatus 10. To this end, the active pen may include various components, e.g., an input button, a transceiver, a logic circuit, and a memory. A signal provided from the touch sensing apparatus 10 to the active pen may be referred to as an uplink signal, and a signal provided from the active pen to the touch sensing apparatus 10 may be referred to as a downlink signal.

Referring to FIG. 9, the touch sensing apparatus 10 and the active pen may communicate in a unit of packet, and a packet may include an uplink period and a downlink period. The touch sensing apparatus 10 may transmit a beacon signal to the active pen, and the beacon signal may include various pieces of information, e.g., a downlink frequency and active pen configuration information. The active pen may normally receive a beacon signal, then transmit an ACK signal to the touch sensing apparatus 10, and extract information from the beacon signal. The active pen may transmit a downlink signal to the touch sensing apparatus 10 based on the extracted information. The touch sensing apparatus 10 may receive the ACK signal from the active pen and then receive the downlink signal from the active pen.

As shown in FIG. 9, the uplink period, e.g., a period during which the beacon signal is transmitted, may be 1.023 milliseconds (ms), the downlink period may include N time slots $TS_1$ to $TS_N$, and a period of one time slot may be 0.25 ms. Accordingly, the touch sensing apparatus 10 may be required to sense the active pen at a high speed. In addition, a high signal-to-noise ratio (SNR) may be required to sense a little capacitance formed between the active pen and the sensor array 11, and repetitive sensing may be required for the high SNR. In addition, for time-multiplexing scan, signals received from the active pen may be lost. As a result, simultaneous sensing for a certain region may be required to sense the active pen.

In some example embodiments, when the touch sensing apparatus 10 transmits an uplink signal, e.g., a beacon signal, to the active pen and then receives a signal from the active pen for the first time, the touch sensing apparatus 10 may use a sensor section including a plurality of sensor groups adjacent to each other to detect a position of the active pen. Accordingly, the touch sensing apparatus 10 may receive a downlink signal through the sensor section, simultaneously detect an approximate position of the active pen, and identify coordinates of the active pen by using a plurality of sensor groups, e.g., sensor groups included in a region of interest, at the detected position. The touch sensing apparatus 10 may support the coarse sensing mode using a sensor section and the fine sensing mode using sensor groups included in a region of interest, and examples of operations of the touch sensing apparatus 10 according to the coarse sensing mode and the fine sensing mode will be described below with reference to FIGS. 10 to 12.

Figure 10:
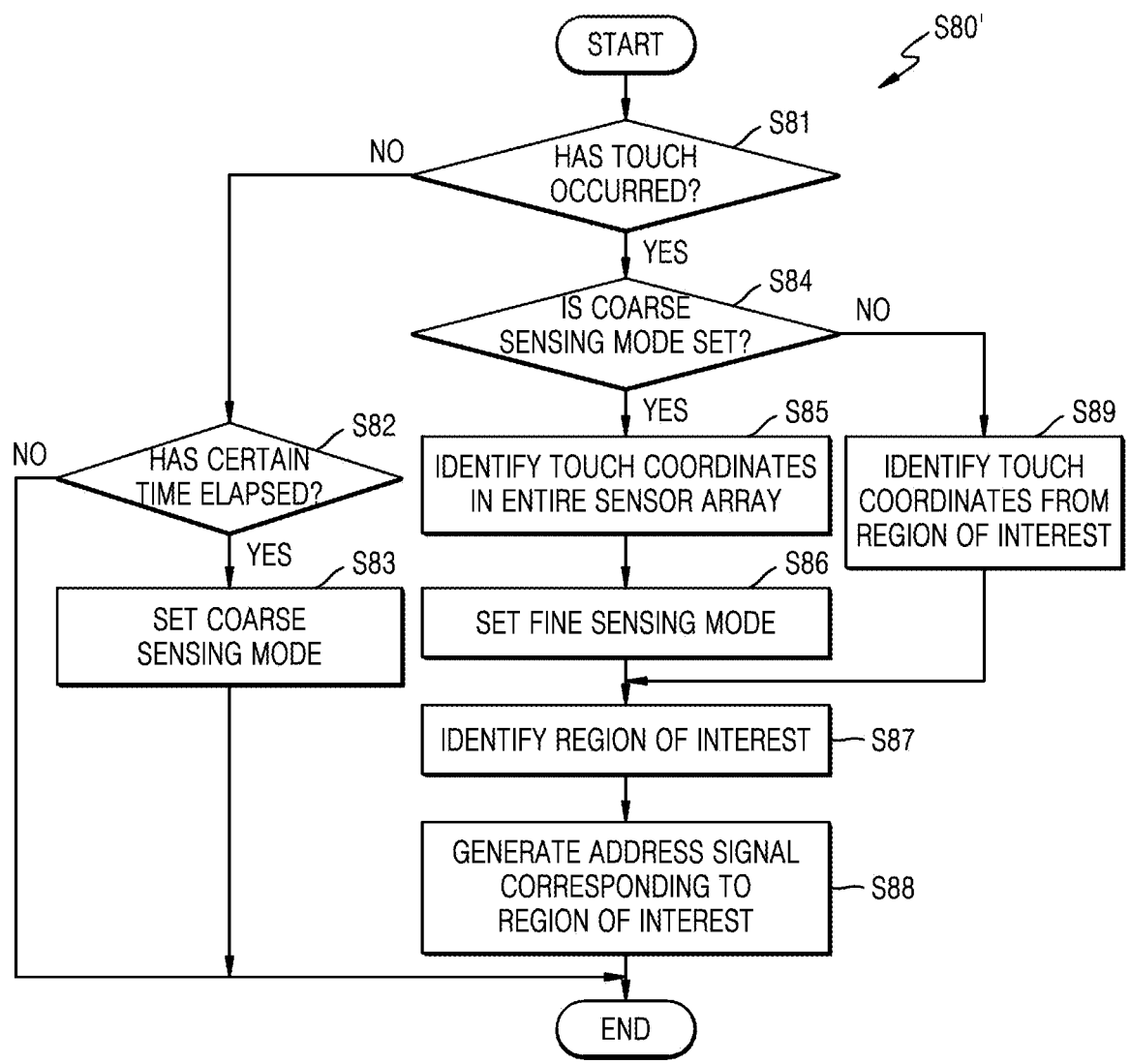
FIG. 10 is a flowchart of a touch sensing method according to an example embodiment of the inventive concepts.

FIG. 10 is a flowchart of a touch sensing method according to an example embodiment of the inventive concepts. Particularly, the flowchart of FIG. 10 shows an example of operation S80 of FIG. 7. As described above with reference to FIG. 7, in operation S80' of FIG. 10, a touch may be identified based on the sensing signal SEN. As shown in FIG. 10, operation S80' may include a plurality of operations S81 to S89. In some example embodiments, operation S80' may be performed by the processing circuit 15 of FIG. 1, and hereinafter, FIG. 10 will be described with reference to FIG. 1 together.

Referring to FIG. 10, in operation S81, it may be determined whether a touch has occurred. For example, the processing circuit 15 may determine whether a touch has occurred, based on the sensing signal SEN provided from the AFE circuit 14. As shown in FIG. 10, when no touch has occurred, operation S82 may be performed next, otherwise when a touch has occurred, operation S84 may be performed next When no touch has occurred, it may be determined in operation S82 whether a certain time has elapsed. For example, the processing circuit 15 may determine whether a time period during which no touch has occurred exceeds a predefined, or, alternatively, desired, reference time period. As shown in FIG. 10, when the time period during which no touch has occurred exceeds the predefined, or, alternatively, desired reference time period, the coarse sensing mode may be set in operation S83, otherwise when the time period during which no touch has occurred does not exceed the predefined, or, alternatively, desired, reference time period, operation S80' may end. In some example embodiments, the processing circuit 15 may provide the mode signal MD indicating the coarse sensing mode to the controller 16.

When a touch has occurred, it may be determined in operation S84 whether the coarse sensing mode is set. As shown in FIG. 10, when the coarse sensing mode is set, operations S85 and S86 may be performed next; otherwise, when the coarse sensing mode is not set, e.g., when the fine sensing mode is set, operation S89 may be performed next.

When it is determined in operation S84 that the coarse sensing mode is set, touch coordinates may be identified in the entire sensor array 11 in operation S85. As described above with reference to FIG. 9, a touch in the coarse sensing mode may be sensed by using a sensor section including sensor groups adjacent to each other. The processing circuit 15 may identify touch coordinates in the entire sensor array 11 based on the sensing signal SEN generated by using the 9×12 sensor sections included in the sensor array 11. The identified touch coordinates may have a resolution of 9×12 and indicate an approximate position of the touch. In operation S86, the fine sensing mode may be set. For example, the processing circuit 15 may switch a sensing mode to the fine sensing mode when a touch is sensed in the coarse sensing mode. In some example embodiments, the processing circuit 15 may provide the mode signal MD indicating the fine sensing mode to the controller 16.

When it is determined in operation S84 that the fine sensing mode is set, touch coordinates may be identified from a region of interest in operation S89. As described above with reference to FIG. 9, a touch in the fine sensing mode may be sensed by using sensor groups. The region of interest may include 12×12 sensors respectively corresponding to different addresses as described above with reference to FIG. 3, and the processing circuit 15 may identify touch coordinates from the region of interest by using the sensing signal SEN generated by using the 12×12 sensors adjacent to each other. The identified touch coordinates may have a resolution of 12×12, and the processing circuit 15 may finally identify touch coordinates having a resolution of 54×72, based on the coordinates of the region of interest.

In operation S87, the region of interest may be identified. For example, the processing circuit 15 may identify the region of interest based on the touch coordinates identified in the coarse sensing mode, e.g., the touch coordinates identified in operation S84, or identify the region of interest based on the touch coordinates identified in the fine sensing mode, e.g., the touch coordinates identified in operation S89. In some example embodiments, the processing circuit 15 may identify the region of interest as a radial region around the identified touch coordinates.

In operation S88, the address signal ADR corresponding to the region of interest may be generated. For example, the processing circuit 15 may generate the address signal ADR for accessing the 12×12 sensors, to sense a touch by using the 12×12 sensors included in the region of interest. The controller 16 may generate the first control signal CTR1 based on the address signal ADR, and accordingly, the 12×12 sensors included in the region of interest may be connected to the AFE circuit 14 by the first switch circuit 12.

Figure 11:
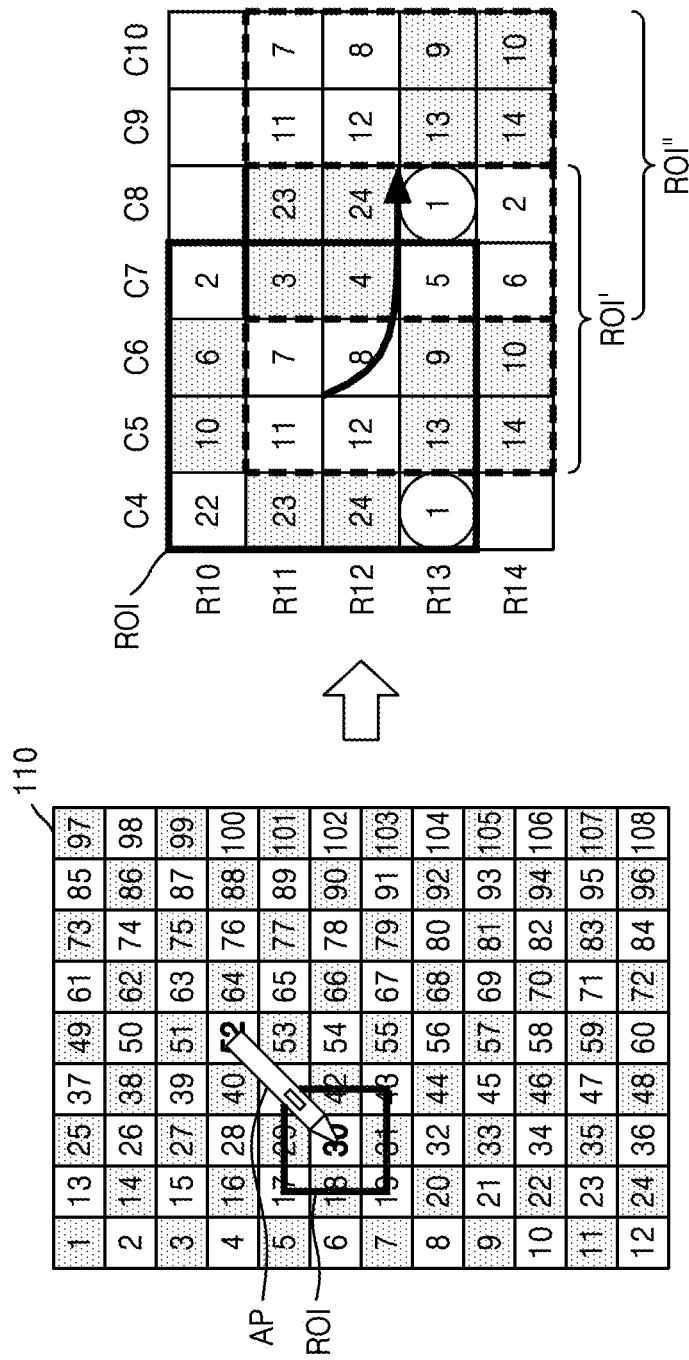
FIG. 11 illustrates a touch sensing operation according to an example embodiment of the inventive concepts.

FIG. 11 illustrates a touch sensing operation according to an example embodiment of the inventive concepts. Particularly, the left of FIG. 11 illustrates an operation of sensing a touch in the coarse sensing mode, and the right of FIG. 11 illustrates an operation of sensing a touch in the fine sensing mode. Hereinafter, FIG. 11 will be described with reference to FIG. 1 together.

Referring to the left of FIG. 11, a touch may be sensed by using the plurality of sensor sections included in the sensor array 11 in the coarse sensing mode. When a touch section includes 2×2 sensor groups adjacent to each other as described above with reference to FIG. 3, the sensor array 110 may include 9×12 sensor sections as shown in FIG. 11. In the coarse sensing mode, a touch of an active pen AP may be sensed by using the 9×12 sensor sections, and coordinates of the touch may have a resolution of 9×12. For example, as shown in FIG. 11, a touch of the active pen AP may be sensed from a $30^{th}$ sensor section.

In some example embodiments, a region ROI of interest may be determined based on a maximum speed and a sensing frequency of the active pen AP. That is, the region ROI of interest may be defined based on the maximum speed at which a user may move the active pen AP. For example, when the maximum speed at which the user may move the active pen AP is 10 m/s, a maximum movable distance of the active pen AP at a sensing frequency of 240 Hz may be approximately 42 mm (0.042≈10/240). Accordingly, the region ROI of interest may be defined to have a left-right length of 42 mm or more, and when one sensor has a left-right length of 4 mm, the region ROI of interest may be defined to include 12×12 sensors (or 4×4 sensor groups) (4 mm*12=48 mm). Accordingly, even though the user moves the active pen AP at a speed of 11.5 m/s, the touch sensing apparatus 10 may track the active pen AP.

In the coarse sensing mode, when a touch of the active pen AP is sensed, a radial region ROI of interest around a sensor section from which the touch has been sensed may be identified. For example, as shown on the left of FIG. 11, when a touch of the active pen AP is sensed from the $30^{th}$ sensor section, the region ROI of interest may be identified as a region including portions of neighboring sensor sections of the $30^{th}$ sensor section. Particularly, referring to the right of FIG. 11, the region ROI of interest may include four sensor groups included in the $30^{th}$ sensor section, e.g., four sensor groups respectively having addresses of 11, 12, 7, and 8, and may further include 10 sensor groups adjacent to the four sensor groups.

Referring to the right of FIG. 11, in the fine sensing mode, a touch of the active pen AP may be sensed by using the 4×4 sensor groups included in the region ROI of interest. As described above with reference to FIG. 3, addresses may be mapped to a plurality of sensor groups so that the 4×4 sensor groups included in the region ROI of interest have different addresses, and accordingly, the touch of the active pen AP may be simultaneously sensed by the 4×4 sensor groups included in the region ROI of interest.

In the fine sensing mode, the region ROI of interest may be shifted according to movement of the active pen AP. For example, as shown by the arrow on the right of FIG. 11, regions ROI' and ROI" of interest shifted from the region ROI of interest may be sequentially identified according to a path along which coordinates of the active pen AP sensed in the region ROI of interest move. In addition, each of the shifted regions ROI' and ROI" of interest may include 12×12 sensors corresponding to different addresses.

Figure 12:
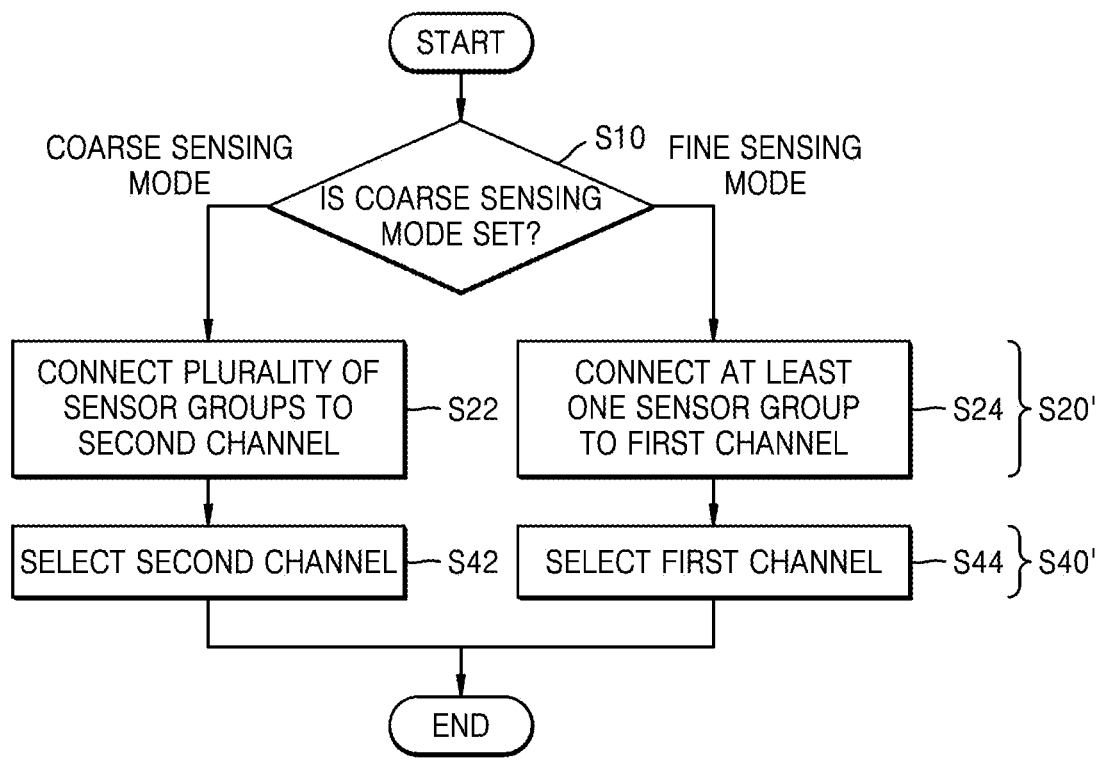
FIG. 12 is a flowchart of a touch sensing method according to an example embodiment of the inventive concepts.

FIG. 12 is a flowchart of a touch sensing method according to an example embodiment of the inventive concepts. Particularly, the flowchart of FIG. 12 shows an example of operations S20 and S40 of FIG. 7. As described above with reference to FIG. 7, in operation S20', a sensor group may be connected to the first channel CH1 or the second channel CH2, and in operation S40', one of the first channel CH1 and the second channel CH2 may be selected. As shown in FIG. 12, operation S20' may include operations S22 and S24, and operation S40' may include operations S42 and S44. In some example embodiments, operation S20' may be performed by the first switch circuit 12 of FIG. 1, and operation S40' may be performed by the second switch circuit 13 of FIG. 1. Hereinafter, FIG. 12 will be described with reference to FIG. 1 together.

In operation S10, a sensing mode may be identified. For example, the controller 16 may identify the coarse sensing mode or the fine sensing mode based on the mode signal MD provided from the processing circuit 15. As shown in FIG. 12, when the coarse sensing mode is identified, operations S22 and S42 may be performed; otherwise, when the fine sensing mode is identified, operations S24 and S44 may be performed.

When the coarse sensing mode is identified in operation S10, a plurality of sensor groups may be connected to the second channel CH2 in operation S22. As described above with reference to the drawings, a sensor section may be used in the coarse sensing mode, and accordingly, the first switch circuit 12 may connect a plurality of sensor groups to the second channel CH2 so that sensors included in sensor groups adjacent to each other operate as a single sensor. Thereafter, in operation S42, the second channel CH2 may be selected. For example, the second switch circuit 13 may select the second channel CH2 between the first channel CH1 and the second channel CH2 based on the second control signal CTR2 so that the second channel CH2 to which the plurality of sensor groups are connected by the first switch circuit 12 in operation S22 is connected to the AFE circuit 14.

When the fine sensing mode is identified in operation S10, at least one sensor group may be connected to the first channel CH1 in operation S24. As described above with reference to the drawings, in the fine sensing mode, sensor groups included in a region of interest may be used, and accordingly, the address signal ADR for designating the region of interest may be provided from the processing circuit 15 to the controller 16. The controller 16 may generate the first control signal CTR1 based on the address signal ADR, and the first switch circuit 12 may connect the sensor groups included in the region of interest to the first channel CH1 based on the first control signal CTR1. In some example embodiments, the first switch circuit 12 may connect the other sensor groups, e.g., sensor groups not included in the region of interest, to the second channels CH2. Thereafter, in operation S44, the first channel CH1 may be selected. For example, the second switch circuit 13 may select the first channel CH1 between the first channel CH1 and the second channel CH2 based on the second control signal CTR2 so that the first channel CH1 to which the sensor groups included in the region of interest are connected by the first switch circuit 12 in operation S24 is connected to the AFE circuit 14.

Figure 13A:
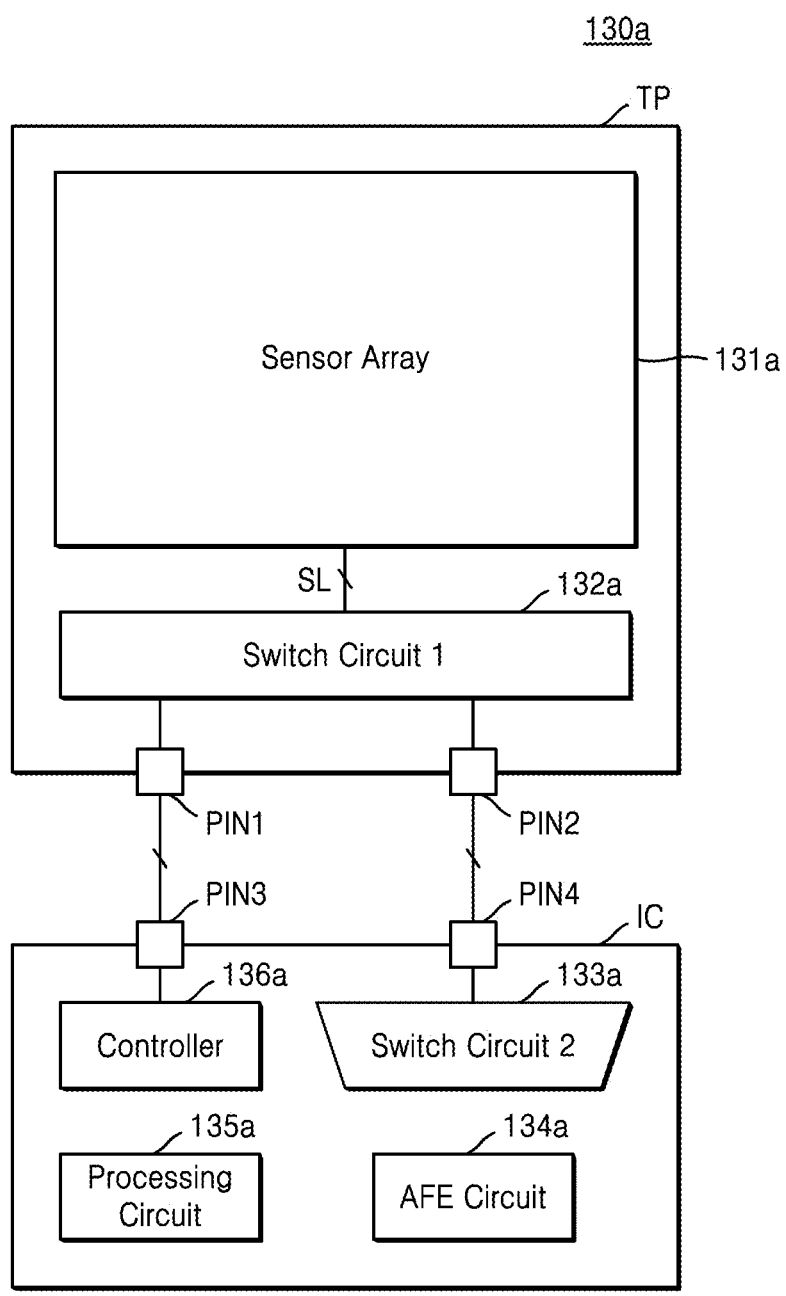
FIGS. 13A and 13B are block diagrams of touch sensing apparatuses according to example embodiments of the inventive concepts.
Figure 13B:
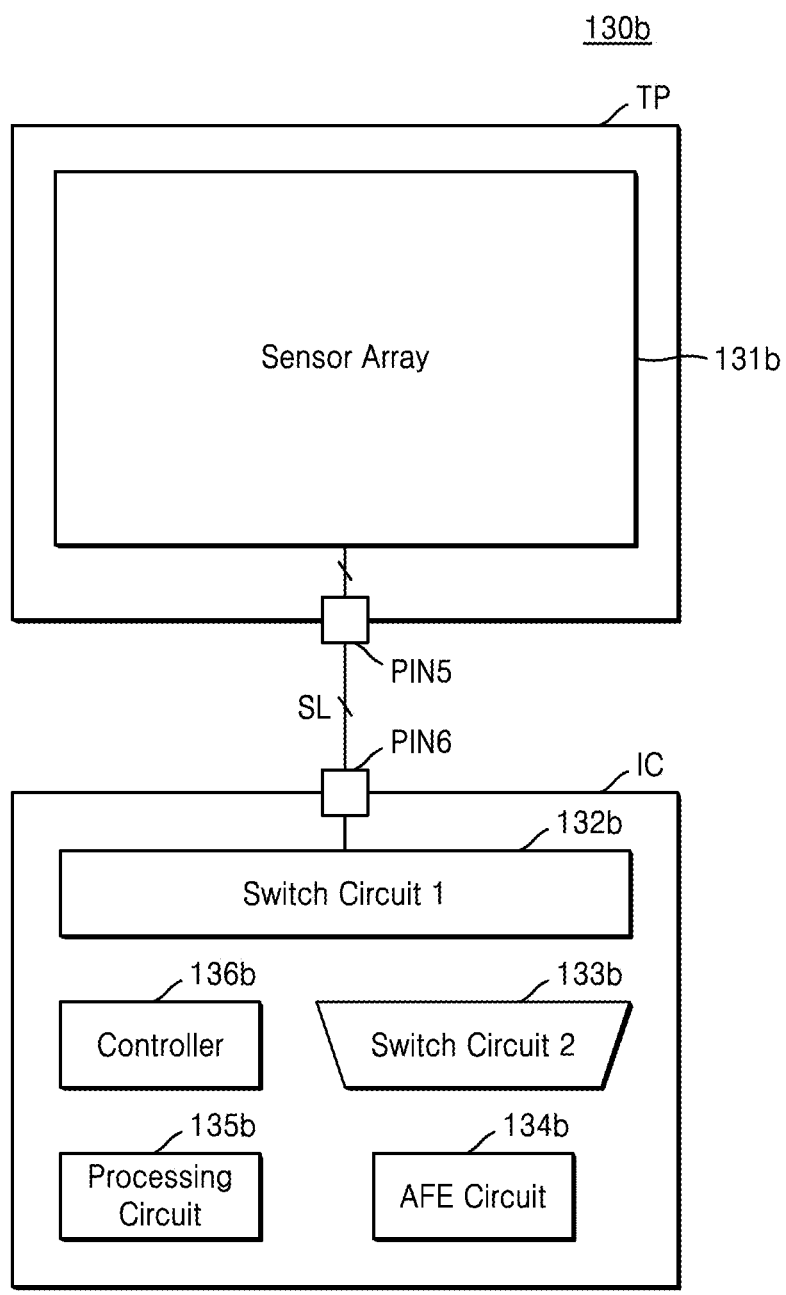

FIGS. 13A and 13B are block diagrams of touch sensing apparatuses according to example embodiments of the inventive concepts. Particularly, the block diagrams of FIGS. 13A and 13B respectively show touch sensing apparatuses 130a and 130b, each including a touch panel TP and an integrated circuit IC. Hereinafter, a duplicated description of FIGS. 13A and 13B will be omitted.

Referring to FIG. 13A, the touch sensing apparatus 130a may include the touch panel TP and the integrated circuit IC. The touch panel TP may include a sensor array 131a and a first switch circuit 132a connected to each other through the plurality of sensor lines SL, and the integrated circuit IC may include a second switch circuit 133a, an AFE circuit 134a, a processing circuit 135a, and a controller 136a. The touch panel TP may be exposed to the outside so that an object may touch the touch panel TP, and in some example embodiments, the touch panel TP may be disposed on a display panel or integrally formed with the display panel. The integrated circuit IC may be fabricated by a semiconductor process and may be implemented as a single chip (or a single die) or as a package including two or more chips. In some example embodiments, the touch panel TP and the integrated circuit IC may be connected to each other through a cable such as a flexible printed circuit (FPC).

When the first switch circuit 132a is included in the touch panel TP, the plurality of sensor lines SL may be formed inside the touch panel TP. In addition, the touch panel TP may include at least one first pin PIN1 connected to the controller 136a in the integrated circuit IC and include a plurality of second pins PIN2 connected to the second switch circuit 133a in the integrated circuit IC. For example, when the sensor array 131a corresponds to the sensor array 31 of FIG. 3, the touch panel TP may include at least 324 second pins PIN2 for the 324 signal lines included in the first channel CH1 and the second channel CH2. Accordingly, the first switch circuit 132a may be connected to the controller 136a through the at least one first pin PIN1 and connected to the second switch circuit 133a through the plurality of second pins PIN2. Similarly, the integrated circuit IC may include at least one third pin PIN3 connected to the at least one first pin PIN1 in the touch panel TP and include a plurality of fourth pins PIN4 respectively connected to the plurality of second pins PIN2 in the touch panel TP.

Referring to FIG. 13B, the touch sensing apparatus 130b may include the touch panel TP and the integrated circuit IC. The touch panel TP may include a sensor array 131b, and the integrated circuit IC may include a first switch circuit 132b, a second switch circuit 133b, an AFE circuit 134b, a processing circuit 135b, and a controller 136b. As shown in FIG. 13B, the touch panel TP and the integrated circuit IC may be connected to each other through the plurality of sensor lines SL.

When the first switch circuit 132b is included in the integrated circuit IC, the touch panel TP may include a plurality of fifth pins PIN5 corresponding to the plurality of sensor lines SL, and the integrated circuit IC may also include a plurality of sixth pins PIN6 corresponding to the plurality of sensor lines SL. For example, when the sensor array 131b corresponds to the sensor array 31 of FIG. 3, the touch panel TP may include 3888 fifth pins PIN5 corresponding to 3888 sensor lines SL, and the integrated circuit IC may also include 3888 sixth pins PIN6 corresponding to the 3888 sensor lines SL (3888=3*18*3*24). That is, the touch panel TP of FIG. 13B may include a greater number of pins than the touch panel TP of FIG. 13A.

Figure 14:
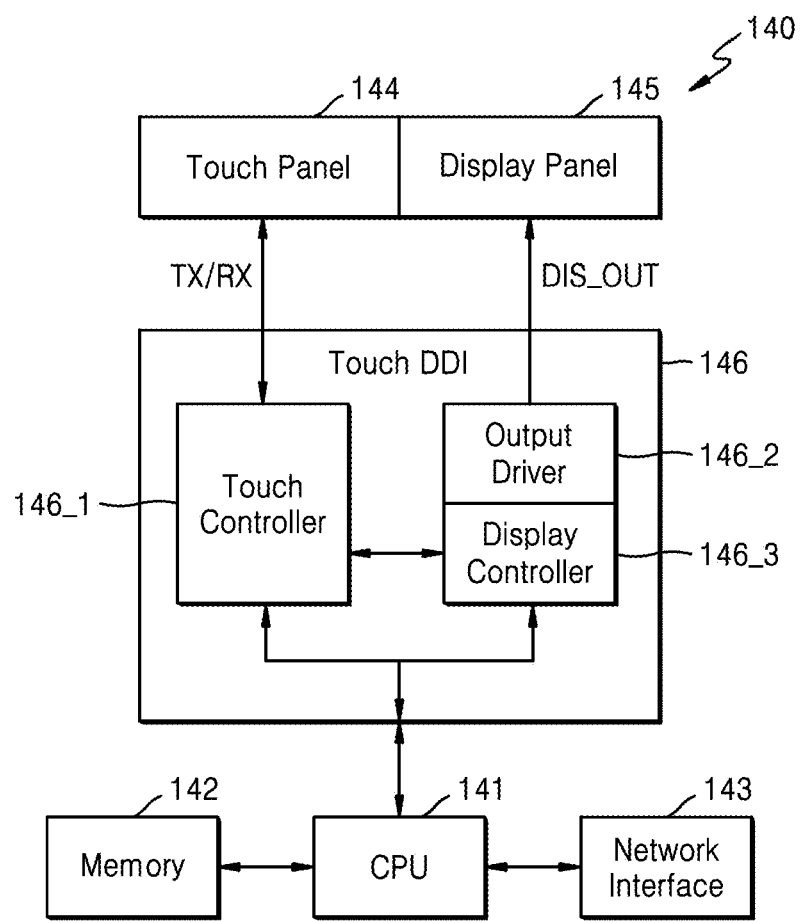
FIG. 14 is a block diagram of a system according to an example embodiment of the inventive concepts.

FIG. 14 is a block diagram of a system 140 according to an example embodiment of the inventive concepts. As shown in FIG. 14, the system 140 may include a central processing unit (CPU) 141, a memory 142, a network interface 143, a touch panel 144, a display panel 145, and a touch display driver IC (DDI) 146. In some example embodiments, unlike shown in FIG. 14, the CPU 141 and the other components in the system 140 may be connected to each other through a bus and communicate with each other through the bus.

The CPU 141 may control a general operation of the system 140 by executing instructions stored in the memory 142 or a memory included in the CPU 141. For example, the CPU 141 may provide image data to the touch DDI 146, recognize an external input based on an image output to the display panel 145 and a detected touch, and perform at least one predefined, or, alternatively, desired, function in response to the external input. In some example embodiments, the CPU 141 may be a system-on-chip (SoC) including a processor, a bus, and a functional block and may be referred to as an application processor (AP).

The memory 142 may be accessed by the CPU 141 and may include, for example, electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), or the like as a nonvolatile memory or dynamic random access memory (DRAM), static random access memory (SRAM), mobile DRAM, double data rate synchronous dynamic random access memory (DDR SDRAM), low power DDR (LPDDR) SDRAM, graphic DDR (GDDR) SDRAM, Rambus dynamic random access memory (RDRAM), or the like as a volatile memory.

The network interface 143 may provide, to the CPU 141, an interface for a network outside the system 140. For example, the network interface 143 may access a wired or wireless network, and deliver a signal received from the network to the CPU 141 or transmit a signal received from the CPU 141 to the network.

The touch DDI 146 may be implemented by at least one chip, e.g., a single chip formed on the same substrate. As shown in FIG. 14, the touch DDI 146 may include a touch controller 146_1 as a component configured to control the touch panel 144, and include an output driver 146_2 and a display controller 146_3 as components configured to control the display panel 145. The touch panel 144 may be disposed on the display panel 145 and transmit therethrough light output from the display panel 145, and the touch panel 144 and the display panel 145 may be generally referred to as a touch screen. The touch panel 144 may include a sensor array (e.g., 11 of FIG. 11).

The touch controller 146_1 may include at least some of components in the touch sensing apparatus described above with reference to the drawings. In some example embodiments, the touch controller 146_1 may include the first switch circuit 12, the second switch circuit 13, the AFE circuit 14, the processing circuit 15, and the controller 16 of FIG. 1. In addition, in some example embodiments, the touch controller 146_1 may include the second switch circuit 13, the AFE circuit 14, the processing circuit 15, and the controller 16 of FIG. 1, and the first switch circuit 12 of FIG. 1 may be included in the touch panel 144. As described above with reference to the drawings, the touch controller 146_1 may sense a touch through a signal TX/RX transmitted/received to/from the touch panel 144 based on a multi-channel and provide a signal including information about the touch to the CPU 141.

The display controller 146_3 may convert image data provided from the CPU 141 into a signal for displaying an image on the display panel 145, and the output driver 146_2 may output a display output signal DIS_OUT under control of the display controller 146_3. As shown in FIG. 14, the display controller 146_3 may communicate with the touch controller 146_1. For example, the display controller 146_3 may provide a signal including information about display timing to the touch controller 146_1, and the touch controller 146_1 may provide a signal about an operation mode, e.g., information about whether to enter a standby mode, to the display controller 146_3.

In some example embodiments, the CPU 141 may provide, to the touch controller 146_1, a signal for setting an operation mode of the touch controller 146_1. For example, the system 140 may have an active pen therein, and when the active pen is separated from the system 140 by a user, the CPU 141 may provide, to the touch controller 146_1, a signal for switching an operation mode of the touch controller 146_1.

In some example embodiments, the touch DDI 146 may include a memory accessed by the touch controller 146_1 and/or the display controller 146_3 and further include a power supply circuit configured to provide power to the touch controller 146_1, the output driver 146_2, and/or the display controller 146_3. In addition, in some example embodiments, unlike shown in FIG. 14, the touch controller 146_1 and the display controller 146_3 may independently communicate with the CPU 141 through individual interfaces (e.g., low speed serial interface (LoSSI), inter-integrated circuit (I2C), and the like).

One or more of the elements disclosed above (e.g., the switch circuit 1 12, switch circuit 2 13, AFE circuit 14, processing circuit 15, controller 16, touch controller 146_1, etc.) may include or be implemented in processing circuitry, individually or collectively, such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:

1. An apparatus for sensing a touch, the apparatus comprising:
   a sensor array comprising a plurality of sensor groups, each of the plurality of sensor groups comprising sensors adjacent to each other;
   a first switch circuit configured to connect each of the plurality of sensor groups to a first channel or a second channel according to a first control signal; and
   a second switch circuit configured to select one of the first channel and the second channel according to a second control signal,
   wherein the first channel comprises first signal lines individually connected to each respective sensor included in a first sensor group of the plurality of sensor groups by the first switch circuit, and
   the second channel comprises a second signal line commonly connected to each of the sensors included in the first sensor group by the first switch circuit.

2. The apparatus of claim 1, wherein the first signal lines are connected to respective sensors included in a second sensor group of the plurality of sensor groups by the first switch circuit.

3. The apparatus of claim 2, wherein the first channel further comprises third signal lines connected to respective sensors included in a third sensor group of the plurality of sensor groups between the first sensor group and the second sensor group by the first switch circuit.

4. The apparatus of claim 3, wherein the first sensor group and the second sensor group are included in different columns of the plurality of sensor groups.

5. The apparatus of claim 2, further comprising an analog front-end circuit configured to simultaneously process signals received from sensors included in a region of interest in the sensor array when the first channel is selected by the second switch circuit,
   wherein the first sensor group and the second sensor group are included in different regions of interest.

6. The apparatus of claim 1, wherein the first control signal comprises:
   row select signals for selecting a row of sensor groups; and
   column select signals for selecting a column of sensor groups.

7. The apparatus of claim 6, wherein the first switch circuit is further configured to connect the first sensor group to the first channel when both a first row select signal and a first column select signal are activated, and connect the first sensor group to the second channel when at least one of the first row select signal and the first column select signal is deactivated.

8. The apparatus of claim 1, wherein the second signal line is commonly connected to sensors included in a fourth sensor group of the plurality of sensor groups adjacent to the first sensor group by the first switch circuit.

9. The apparatus of claim 1, further comprising a controller configured to generate the second control signal so that the second channel is selected by the second switch circuit in a coarse sensing mode, and the first channel is selected by the second switch circuit in a fine sensing mode.

10. The apparatus of claim 9, wherein the controller is further configured to generate the first control signal based on an address signal so that the plurality of sensor groups are connected to the second channel in the coarse sensing mode, and at least one sensor group of the plurality of sensor groups is connected to the first channel in the fine sensing mode.

11. The apparatus of claim 10, further comprising:
   an analog front-end circuit configured to generate a sensing signal based on signals provided from the second switch circuit; and
   a processing circuit configured to identify a region of interest including a sensor group of the plurality of sensor groups from which a touch has been sensed, based on the sensing signal in the coarse sensing mode, and generate the address signal in the fine sensing mode so that sensor groups of the plurality of sensor groups included in the region of interest are connected to the first channel.

12. The apparatus of claim 11, wherein the processing circuit is further configured to periodically detect an active pen and to identify the region of interest based on the active pen being detected.

13. The apparatus of claim 12, wherein the region of interest has an area determined based on a maximum speed and a sensing frequency of the active pen.

14. The apparatus of claim 1, wherein the sensor array and the first switch circuit are included in a touch panel, and
the touch panel comprises a plurality of pins for the first control signal, the first channel, and the second channel.

15. An apparatus for sensing a touch, the apparatus comprising:
a sensor array comprising a plurality of sensor groups, each of the plurality of sensor groups comprising sensors adjacent to each other;
a first switch circuit connected to each of sensors included in the plurality of sensor groups;
a second switch circuit connected to the first switch circuit through a first channel and a second channel;
an analog front-end circuit configured to generate a sensing signal based on signals received from the second switch circuit; and
a controller configured to control the first switch circuit so that each of the plurality of sensor groups is connected to the first channel or the second channel, and control the second switch circuit to select one of the first channel and the second channel.

16. The apparatus of claim 15, wherein the first switch circuit comprises a switch unit array comprising a plurality of switch units corresponding to respective sensor groups of the plurality of sensor groups, and
the controller is further configured to provide, to the first switch circuit, a first select signal including row select signals for selecting switch units corresponding to a row of sensor groups of the plurality of sensor groups and column select signals for selecting switch units corresponding to a column of sensor groups of the plurality of sensor groups.

17. The apparatus of claim 16, wherein the switch unit array comprises a first switch unit corresponding to a first sensor group of the plurality of sensor groups, and
the first switch unit is configured to connect sensors of the first sensor group to first signal lines included in the first channel, respectively, in response to an activated first row select signal and an activated first column select signal and commonly connect the sensors of the first sensor group to a second signal line included in the second channel in response to a deactivated first row select signal or a deactivated first column select signal.

18. The apparatus of claim 17, wherein the switch unit array comprises a second switch unit corresponding to a second sensor group of the plurality of sensor groups, and
the second switch unit is configured to connect sensors of the second sensor group to the first signal lines, respectively, in response to an activated second row select signal and an activated second column select signal.

19. The apparatus of claim 17, wherein the switch unit array comprises a fourth switch unit corresponding to a fourth sensor group of the plurality of sensor groups adjacent to the first sensor group, and
the fourth switch unit is configured to connect sensors of the fourth sensor group to third signal lines included in the first channel, respectively, in response to an activated fourth row select signal and an activated fourth column select signal and commonly connect the sensors of the fourth sensor group to the second signal line in response to a deactivated fourth row select signal or a deactivated fourth column select signal.

20. A method of sensing a touch by using a plurality of sensor groups, each of the plurality of sensor groups comprising sensors adjacent to each other, the method comprising:
connecting each of the plurality of sensor groups to a first channel or a second channel; and
selecting one of the first channel and the second channel;
generating a sensing signal from a signal received through the selected channel;
identifying a touch based on the sensing signal,
wherein the first channel comprises signal lines individually corresponding to each respective sensor included in a sensor group of the plurality of sensor groups, and
the second channel comprises a signal line commonly corresponding to each of the sensors included in the sensor group.

* * * * *